United States Patent
Mysore et al.

(10) Patent No.: US 11,120,479 B2
(45) Date of Patent: Sep. 14, 2021

(54) PLATFORM FOR PROGRAMMATIC ADVERTISING

(71) Applicant: Magnite, Inc., Playa Vista, CA (US)

(72) Inventors: Shrikanth Bhaskar Mysore, Littleton, MA (US); Benjamin Gordon, Hingham, MA (US)

(73) Assignee: Magnite, Inc., Playa Vista, CA (US)

( * ) Notice: Subject to any disclaimer, the term of this patent is extended or adjusted under 35 U.S.C. 154(b) by 598 days.

(21) Appl. No.: 15/412,472

(22) Filed: Jan. 23, 2017

(65) Prior Publication Data

US 2017/0213255 A1 Jul. 27, 2017

Related U.S. Application Data

(60) Provisional application No. 62/286,769, filed on Jan. 25, 2016.

(51) Int. Cl.
*G06Q 30/02* (2012.01)
*G06N 20/00* (2019.01)

(52) U.S. Cl.
CPC ......... *G06Q 30/0275* (2013.01); *G06N 20/00* (2019.01); *G06Q 30/0246* (2013.01)

(58) Field of Classification Search
CPC . G06Q 30/0275; G06Q 30/0246; G06N 20/00
See application file for complete search history.

(56) References Cited

U.S. PATENT DOCUMENTS

| | | |
|---|---|---|
| 5,948,061 A | 9/1999 | Merrimen et al. |
| 6,108,703 A | 8/2000 | Leighton et al. |

(Continued)

FOREIGN PATENT DOCUMENTS

| | | |
|---|---|---|
| CA | 2673352 | 6/2009 |
| JP | 2002/163549 A | 6/2002 |

(Continued)

OTHER PUBLICATIONS

Optimization of Real Time Auction Bidding Strategies in Mobile Advertisement; Alexander Dur (Year: 2014).*

(Continued)

*Primary Examiner* — Victoria E Frunzi
(74) *Attorney, Agent, or Firm* — Knobbe, Martens, Olson & Bear LLP

(57) ABSTRACT

A system to control programmatic advertising traffic that provides to a demand-side platform (DSP) server a desired amount and type of digital advertisement inventory data traffic from at least one real-time-bidding (RTB) advertising exchange. The system includes a network traffic management computing platform that receives the digital advertisement inventory data traffic over at least one network. The system also includes a toggle component of the network traffic management computing platform that restricts delivery of a portion and routes delivery of an unrestricted portion of the digital advertisement inventory data traffic to the DSP server based on pre-selected parameters. The toggle component also routes data representing a bid to the at least one RTB advertising exchange associated with the unrestricted portion of the digital advertisement inventory data traffic delivered to the at least one DSP server.

21 Claims, 14 Drawing Sheets

(56) References Cited

U.S. PATENT DOCUMENTS

| | | |
|---|---|---|
| 6,285,987 B1 | 9/2001 | Roth et al. |
| 6,324,519 B1 | 11/2001 | Eldering |
| 6,487,538 B1 | 11/2002 | Gupta et al. |
| 6,546,427 B1 | 4/2003 | Ehrlich et al. |
| 6,590,529 B2 | 7/2003 | Schwoegler |
| 6,687,737 B2 | 2/2004 | Landsman et al. |
| 6,725,203 B1 | 4/2004 | Seet et al. |
| 6,757,571 B1 | 6/2004 | Toyama |
| 6,763,148 B1 | 7/2004 | Sternberg et al. |
| 6,763,334 B1 | 7/2004 | Matsumoto et al. |
| 6,892,193 B2 | 5/2005 | Bolle et al. |
| 6,937,744 B1 | 8/2005 | Toyama |
| 6,954,783 B1 | 10/2005 | Bodwell et al. |
| 6,973,438 B1 | 12/2005 | Philyaw |
| 7,038,637 B1 | 5/2006 | Eller et al. |
| 7,076,244 B2 | 7/2006 | Lazaridis et al. |
| 7,085,732 B2 | 8/2006 | Gould |
| 7,085,817 B1 | 8/2006 | Tock et al. |
| 7,406,498 B2 | 7/2008 | Reshef et al. |
| 7,428,555 B2 | 9/2008 | Yan |
| 7,475,404 B2 | 1/2009 | Hamel |
| 7,650,420 B2 | 1/2010 | Chong et al. |
| 7,882,046 B1 | 2/2011 | Kizhakkekalathil et al. |
| 7,917,491 B1 * | 3/2011 | Sack .................. G06Q 30/02 707/708 |
| 7,958,040 B2 | 6/2011 | Jain et al. |
| 8,315,908 B1 | 11/2012 | Peretz |
| 8,331,228 B2 | 12/2012 | Huber |
| 8,340,685 B2 | 12/2012 | Cochran |
| 8,472,728 B1 | 6/2013 | Chau et al. |
| 8,473,346 B2 | 6/2013 | Mattern et al. |
| 8,554,683 B2 | 10/2013 | Knapp et al. |
| 8,768,766 B2 * | 7/2014 | Ellis .................. G06Q 30/0242 705/14.43 |
| 8,831,987 B2 | 9/2014 | Knapp et al. |
| 8,849,931 B2 | 9/2014 | Linner |
| 9,036,808 B2 * | 5/2015 | Kelley ............... G06Q 30/0202 379/201.01 |
| 9,076,151 B2 | 7/2015 | Patton et al. |
| 9,135,655 B2 * | 9/2015 | Buchalter .............. G06Q 30/02 |
| 9,202,248 B2 | 12/2015 | Bi et al. |
| 9,208,507 B2 | 12/2015 | Mattern et al. |
| 2002/0029186 A1 | 3/2002 | Roth et al. |
| 2002/0107787 A1 | 8/2002 | Mashinsky et al. |
| 2002/0143901 A1 | 10/2002 | Lupo et al. |
| 2002/0161680 A1 | 10/2002 | Tarnoff |
| 2002/0165849 A1 | 11/2002 | Singh et al. |
| 2002/0169760 A1 | 11/2002 | Cheung et al. |
| 2003/0033292 A1 | 2/2003 | Meisel et al. |
| 2003/0055729 A1 | 3/2003 | Bezos et al. |
| 2003/0135460 A1 | 7/2003 | Talegon |
| 2003/0162329 A1 | 8/2003 | Lucas et al. |
| 2003/0195837 A1 | 10/2003 | Kostic et al. |
| 2003/0212762 A1 | 11/2003 | Barnes |
| 2003/0220866 A1 | 11/2003 | Pisaris-Henderson et al. |
| 2004/0027594 A1 | 2/2004 | Suzuki et al. |
| 2004/0039733 A1 | 2/2004 | Soulanille |
| 2004/0044571 A1 | 3/2004 | Bronnimann et al. |
| 2004/0054589 A1 | 3/2004 | Nicholas et al. |
| 2004/0073482 A1 | 4/2004 | Wiggins |
| 2004/0103024 A1 | 5/2004 | Patel et al. |
| 2004/0111319 A1 | 6/2004 | Matsumoto et al. |
| 2004/0117213 A1 | 6/2004 | Pache, Jr. et al. |
| 2004/0133469 A1 | 7/2004 | Chang |
| 2004/0144064 A1 | 7/2004 | Viltro et al. |
| 2004/0148222 A1 | 7/2004 | Sabella et al. |
| 2004/0199397 A1 | 10/2004 | Dresden |
| 2004/0249709 A1 | 12/2004 | Donnovan et al. |
| 2004/0267612 A1 | 12/2004 | Veach |
| 2004/0267878 A1 | 12/2004 | Osias |
| 2005/0021440 A1 | 1/2005 | Dresden |
| 2005/0027594 A1 | 2/2005 | Yasnovsky et al. |
| 2005/0033682 A1 | 2/2005 | Levy et al. |
| 2005/0038900 A1 | 2/2005 | Krassner et al. |
| 2005/0055271 A1 | 3/2005 | Axe et al. |
| 2005/0137939 A1 | 6/2005 | Calabria et al. |
| 2005/0144064 A1 | 6/2005 | Calabria et al. |
| 2005/0216335 A1 | 9/2005 | Fikes et al. |
| 2005/0224496 A1 | 10/2005 | Moyer |
| 2005/0228736 A1 | 10/2005 | Norman et al. |
| 2005/0228746 A1 | 10/2005 | McHale et al. |
| 2005/0255702 A1 | 11/2005 | Honeycutt et al. |
| 2005/0267798 A1 | 12/2005 | Tiziano |
| 2005/0267805 A1 | 12/2005 | Tarantino |
| 2006/0026067 A1 | 2/2006 | Nicholas et al. |
| 2006/0047579 A1 | 3/2006 | Dresden |
| 2006/0074752 A1 | 4/2006 | Newmark |
| 2006/0095281 A1 | 5/2006 | Chickering et al. |
| 2006/0095336 A1 | 5/2006 | Heckerman et al. |
| 2006/0106709 A1 | 5/2006 | Chickering et al. |
| 2006/0106710 A1 | 5/2006 | Meek et al. |
| 2006/0122907 A1 | 6/2006 | Gould |
| 2006/0129453 A1 | 6/2006 | Gardner et al. |
| 2006/0155597 A1 | 7/2006 | Gleason |
| 2006/0178900 A1 | 8/2006 | Shilo et al. |
| 2006/0184417 A1 | 8/2006 | Van der Linden |
| 2006/0190333 A1 | 8/2006 | Choi |
| 2006/0190385 A1 | 8/2006 | Dresden |
| 2006/0200445 A1 | 9/2006 | Chen et al. |
| 2006/0212350 A1 | 9/2006 | Ellis et al. |
| 2006/0212351 A1 | 9/2006 | Funahashi |
| 2006/0224447 A1 | 10/2006 | Koningstein |
| 2006/0224496 A1 | 10/2006 | Sandholm et al. |
| 2006/0230029 A1 | 10/2006 | Yan |
| 2006/0253578 A1 | 11/2006 | Dixon et al. |
| 2006/0271426 A1 | 11/2006 | Borgs et al. |
| 2006/0271429 A1 | 11/2006 | Borgs et al. |
| 2006/0282328 A1 | 12/2006 | Gerace et al. |
| 2006/0287913 A1 | 12/2006 | Baluja |
| 2006/0287916 A1 | 12/2006 | Starr et al. |
| 2007/0027768 A1 | 2/2007 | Collins et al. |
| 2007/0038516 A1 | 2/2007 | Apple et al. |
| 2007/0055577 A1 | 3/2007 | Ashton |
| 2007/0067267 A1 | 3/2007 | Ives |
| 2007/0087756 A1 | 4/2007 | Hoffberg |
| 2007/0121848 A1 | 5/2007 | Faber et al. |
| 2007/0130009 A1 | 6/2007 | Steelberg et al. |
| 2007/0174118 A1 | 7/2007 | Dekel |
| 2007/0174230 A1 | 7/2007 | Martin |
| 2007/0192194 A1 | 8/2007 | O'Donnell et al. |
| 2007/0192356 A1 | 8/2007 | O'Kelley |
| 2007/0208630 A1 | 9/2007 | Chatter et al. |
| 2007/0239532 A1 | 10/2007 | Benson et al. |
| 2007/0250301 A1 | 10/2007 | Vaisberg et al. |
| 2007/0260514 A1 | 11/2007 | Burdick |
| 2007/0261112 A1 | 11/2007 | Todd et al. |
| 2008/0040225 A1 | 2/2008 | Roker |
| 2008/0040302 A1 | 2/2008 | Perrizo |
| 2008/0046924 A1 | 2/2008 | Hood |
| 2008/0052195 A1 | 2/2008 | Roth |
| 2008/0140508 A1 | 6/2008 | Anand et al. |
| 2008/0162329 A1 | 7/2008 | Knapp et al. |
| 2008/0195458 A1 | 8/2008 | Anschutz et al. |
| 2008/0215290 A1 | 9/2008 | Zweben et al. |
| 2008/0228746 A1 | 9/2008 | Markus et al. |
| 2008/0270359 A1 | 10/2008 | Madhavan et al. |
| 2008/0281983 A1 | 11/2008 | Cooley et al. |
| 2009/0006192 A1 | 1/2009 | Martinez |
| 2009/0006375 A1 | 1/2009 | Lax |
| 2009/0012903 A1 | 1/2009 | Subramanian et al. |
| 2009/0018907 A1 | 1/2009 | McCarthy et al. |
| 2009/0037277 A1 | 2/2009 | Zuckerberg |
| 2009/0043648 A1 | 2/2009 | Mahdian et al. |
| 2009/0055267 A1 | 2/2009 | Roker |
| 2009/0083190 A1 | 3/2009 | Isshiki et al. |
| 2009/0234713 A1 | 9/2009 | Bi et al. |
| 2009/0327029 A1 | 12/2009 | Collins |
| 2009/0327084 A1 | 12/2009 | Patton et al. |
| 2010/0057556 A1 | 3/2010 | Rousso et al. |
| 2010/0082423 A1 | 4/2010 | Nag et al. |
| 2010/0082439 A9 * | 4/2010 | Patel .................. G06Q 30/02 705/14.72 |
| 2010/0082472 A1 | 4/2010 | Cheung |
| 2010/0106715 A1 | 4/2010 | Byun et al. |

(56) References Cited

U.S. PATENT DOCUMENTS

| | | | |
|---|---|---|---|
| 2010/0138290 A1* | 6/2010 | Zschocke | G06Q 30/0242 705/14.41 |
| 2010/0145809 A1 | 6/2010 | Knapp et al. | |
| 2010/0191600 A1 | 7/2010 | Sideman | |
| 2011/0225608 A1 | 9/2011 | Lopatecki et al. | |
| 2011/0258049 A1 | 10/2011 | Ramer et al. | |
| 2011/0282730 A1 | 11/2011 | Tarmas | |
| 2011/0320259 A1 | 12/2011 | Roumeliotis et al. | |
| 2012/0047011 A1 | 2/2012 | Rippetoe | |
| 2012/0209710 A1 | 8/2012 | Ramer et al. | |
| 2012/0239508 A1 | 9/2012 | Deangelis | |
| 2013/0046636 A1 | 2/2013 | Asnake | |
| 2013/0282476 A1* | 10/2013 | Peterson | G06Q 30/0241 705/14.41 |
| 2013/0282478 A1 | 10/2013 | Mattern et al. | |
| 2013/0297317 A1 | 11/2013 | Lee | |
| 2013/0311296 A1 | 11/2013 | Watfa | |
| 2014/0019253 A1 | 1/2014 | Ricasata | |
| 2014/0032306 A1 | 1/2014 | Sukornyk et al. | |
| 2014/0136312 A1 | 5/2014 | Saksena et al. | |
| 2014/0172573 A1 | 6/2014 | Saurabh | |
| 2014/0181715 A1 | 6/2014 | Axelrod | |
| 2014/0278981 A1* | 9/2014 | Mersov | G06Q 30/02 705/14.53 |
| 2014/0307968 A1 | 10/2014 | Chattopadhyay | |
| 2014/0351059 A1* | 11/2014 | Massoudi | G06Q 30/0251 705/14.66 |
| 2014/0365297 A1 | 12/2014 | Durvasula et al. | |
| 2014/0365298 A1 | 12/2014 | Tang | |
| 2015/0120468 A1 | 4/2015 | Knapp et al. | |
| 2015/0142585 A1* | 5/2015 | Scalise | G06Q 30/0277 705/14.73 |
| 2015/0148005 A1 | 5/2015 | Chau et al. | |
| 2015/0236738 A1 | 8/2015 | Kan et al. | |
| 2015/0248697 A1 | 9/2015 | Mahadevan et al. | |
| 2015/0269590 A1 | 9/2015 | Patton et al. | |
| 2015/0269610 A1 | 9/2015 | Bi et al. | |
| 2015/0278867 A1 | 10/2015 | Lerman et al. | |
| 2015/0287072 A1* | 10/2015 | Golden | G06Q 30/0244 705/14.43 |
| 2015/0302462 A1* | 10/2015 | Chan | G06Q 30/0243 705/14.42 |
| 2015/0332349 A1* | 11/2015 | Els | G06Q 30/0275 705/14.71 |
| 2016/0125453 A1* | 5/2016 | Shukla | G06Q 30/0244 705/14.45 |
| 2016/0332349 A1 | 11/2016 | Lemke et al. | |
| 2017/0024778 A1 | 1/2017 | Knapp | |

FOREIGN PATENT DOCUMENTS

| | | | |
|---|---|---|---|
| WO | WO 2000/033163 | 6/2000 | |
| WO | WO 2000/041105 | 7/2000 | |
| WO | WO 2000/58897 | 10/2000 | |
| WO | WO 2001/043027 | 6/2001 | |
| WO | WO 2003/025823 | 3/2003 | |
| WO | WO 2003/058531 | 7/2003 | |
| WO | WO 2004/068299 | 8/2004 | |
| WO | WO 2005/116874 | 12/2005 | |
| WO | WO 2006/026030 | 3/2006 | |
| WO | WO 2006/062760 | 6/2006 | |
| WO | WO 2006/091970 A2 | 8/2006 | |
| WO | WO 2006/096768 | 9/2006 | |
| WO | WO 2006/097826 | 9/2006 | |
| WO | WO 2006/104845 | 10/2006 | |
| WO | WO 20061104854 | 10/2006 | |
| WO | WO 2006/127645 | 11/2006 | |
| WO | WO 2006/128104 | 11/2006 | |
| WO | WO 2007/022137 | 2/2007 | |
| WO | WO 2007/120956 A2 | 10/2007 | |
| WO | WO2007120956 | * 10/2007 | G06Q 30/00 |
| WO | WO 2008/077078 | 6/2008 | |
| WO | WO 2008/109071 | 9/2008 | |
| WO | WO 2009/114634 | 9/2009 | |
| WO | WO 2012/174650 A1 | 12/2012 | |
| WO | WO2015184607 | * 12/2015 | G06Q 30/02 |
| WO | WO 2016/184607 A1 | 12/2016 | |

OTHER PUBLICATIONS

International Search Report and Written Opinion regarding PCT Application No. PCT/US17/14528, dated Jan. 23, 2017, 13 pages.
U.S. Appl. No. 10/351,689, filed Jan. 24, 2003, Sabella et al.
U.S. Appl. No. 11/096,283, filed Mar. 31, 2005, Koningstein.
U.S. Appl. No. 60/323,060, filed Sep. 18, 2001, Gould.
U.S. Appl. No. 60/344,100, filed Dec. 28, 2001, Pisaris-Henderson et al.
U.S. Appl. No. 60/701,615, filed Jul. 21, 2005, Klopf.
U.S. Appl. No. 61/069,082, filed Mar. 11, 2008, Bi et al.
U.S. Appl. No. 61/197,942, filed Oct. 31, 2008, Williams et al.
Akamai Technologies, Inc., Fast Internet Technology with FreeFlow, Apr. 2000, Cambridge, MA.
Akamai Technologies, Inc., FreeFlow Flyer, 1999, Cambridge MA.
Baird, Edward J., Office Action, dated Jan. 25, 2011, filed in Applicant's co-pending U.S. Appl. No. 11/959,385.
Canadian Office Action dated Sep. 14, 2016, Application No. 2,673,352, 3 pages.
Canadian Office Action regarding Application No. 2,673,352, PCT No. US2007088002, 5 pages, dated Jul. 13, 2015.
Cisco Systems, Inc., The Network Architecture Behind NetAid, 1999, pp. 1-17, San Jose, CA.
Doubleclick, Inc., Technical Specs for the DoubleClick DART System, www.doubleclick.com, 1998.
Edelman et al "Internet Advertising and the Generalized Second Price Auction: Selling Billions of Dollars Worth of Keywords", Working Paper 11765, National Bureau of Economic Research, Cambridge, MA 02138, Nov. 2005.
Extended European Search Report for corresponding European Application 09718908.8, dated May 22, 2012.
Geddes, Brad "Geographic Targeting in an Enhanced Campaign World," Mar. 18, 2013.
Langheinrich, M., Unintrusive Customization Techniques for Web Advertising, May 1999, pp. 1-18, Proceedings of the Eighth International World Wide Web Conference, Canada.
Leppäniemi et al., "The Success Factors of Mobile Advertising Value Chain," *E-Business Review IV*, pp. 93-97 (2004).
PCT International Search Report dated Apr. 23, 2008 for PCT Application No. PCT/US07/88002.
PubMatic (Apr. 16, 2009,). Predicting Ad Network Frequency Capping to Increase Publisher Revenue; Retrieved from http://www.pubmatic.com/wp-content!uploads/2009/07/PubMatic.FrequencyOptimization.2009.pdf (Hereafter, Pubmatic).
PubMatic (Apr. 16, 2009,). Pubmatic New Technology Increased Publisher Revenu from Ad Network Frequency Capped Campaigns; Retrieved from http://www.pubmatic.com/04-16-2009).
Scharl et al., "Diffusion and success factors of mobile marketing," *Electronic Research and Applications* 4 (2005) 159-173.
Yardley, Greg, "Rubicon Project: initial impressions", Feb. 23, 2008, pp. 1-5, XP002674792, retrieved from the Internet: http://yardley.ca/2008/02/23rubicon-project-initial-impressions/ (retrieved on Apr. 25, 2012).
Young, Lee W., International Search Report and Written Opinion; dated Apr. 23, 2008, filed in Applicant's related PCT patent application No. PCT/US07/088002.
Young, Lee W., Transmittal of International Search Report and Written Opinion dated Mar. 7, 2011 in Applicants' co-pending PCT International Application No. PCT/US2011 /020584.
Vangie Beal, Mirror Site, Oct. 18, 2014, Webopedia, printed through www.archive.org (Year: 2014).

\* cited by examiner

Settlement Report Center nTOGGLE — http://ntoggle.com/src — adam@dsp.com — 900

Auctions

Attributes — 902 search

Exchange ▼
- ☑ All Supply
- ☑ Apps
- ☐ Mobile Web
- ☑ iOS
- ☐ Android
- ☐ Other

Settings — 904

Statistics

| Apps | ▶ Publisher | ▲ Placement | ▲ Creative | Metric | Count ▼ |
|---|---|---|---|---|---|
| 10/01/14 | CBS Interactive | TV Guide Mobile | 234515 | view | 128004 |
| 10/01/14 | Resignation Media | theCHIVE iOS | 234515 | view | 32193 |
| 10/01/14 | iHandysoft | Gtalk | 234515 | view | 23129 |
| 10/01/14 | Scopely, Inc. | Dice With Buddies Free | 234515 | view | 5432 |
| 10/01/14 | Lifelike Apps | Inc., Craigslist | 234515 | view | 4323 |
| 10/01/14 | yuilop | yuilop | 234515 | view | 4212 |
| 10/01/14 | Mobiles Republic | Glam Life | 234515 | view | 2135 |
| 10/01/14 | Frendz LLC | BuzzE Social Networking | 234515 | view | 2112 |
| 10/01/14 | UberMedia | Weather+ | 234515 | view | 1535 |
| 10/01/14 | iHandySoft | Mini Flashlight | 234515 | view | 1333 |
| 10/01/14 | Scopely | Inc., Mini Golf MatchUp | 234515 | view | 1298 |
| 10/01/14 | Mobiles Republic | Appy Geek | 234515 | view | 1204 |
| 10/01/14 | Demand Media | Cracked Reader | 234515 | view | 1004 |
| 10/01/14 | MLB | MiLB First Pitch | 234515 | view | 998 |

| Handset | Filtered | Traffic | Available | Daily Traffic |
|---|---|---|---|---|
| iPhone 6 | 25752 | | 250322 | |
| iPhone 6 Plus | 12744 | | 69825 | |
| iPhone 5S | 73421 | | 1931283 | |

FIG. 10

PLATFORM FOR PROGRAMMATIC ADVERTISING

CROSS-REFERENCE TO RELATED APPLICATIONS

This application claims the benefit of U.S. provisional patent application Ser. No. 62/286,769 filed Jan. 25, 2016, the entirety of which is incorporated herein by reference.

BACKGROUND

Field

The present disclosure relates to the field of programmatic advertising in general, and a cloud-based platform for efficient routing of traffic in programmatic advertising in particular.

Description of the Related Art

Programmatic advertising refers to software based buying and selling of online ad spaces across electronic networks, such as advertising networks that use or interface with the Internet. The network-based technology of programmatic advertising enables the automatic purchase of electronic ad inventory that is offered across various advertising networks by digital advertisers in an efficient manner, typically in real-time with inventory offerings. Advertisers looking for online electronic ad spaces generally depend upon demand side computing platforms (DSPs) to make online electronic ad inventory purchase transactions from sellers of digital ad spaces. The sellers are generally real-time bidding (RTB) based electronic advertising exchanges operating on high-speed computing servers over fast networks. The operation of programmatic advertising involves the continuous electronic exchange of bid request and bid response data traffic between the DSP servers and the RTB ad exchange servers over electronic advertising networks and the Internet.

In recent years, the programmatic advertising industry has grown at such an enormous pace that the network resources (e.g., links, endpoints, and the like) required to handle the real-time bid request/response traffic are increasingly overwhelmed by the traffic, causing network delays, poor computing and network performance, lack of access to suitable ads, inefficient placement of ads, poor use of advertising budgets, poor scalability, and generally poor overall performance. The network resources simply have difficulty handling the traffic that is coming from the RTB ad exchanges, and the DSP servers are not able to keep up with the increased traffic flow without adding expensive additional capacity, further diminishing the effective performance of the programmatic advertising environment at affordable capacity levels.

RTB ad exchanges may offer trillions of bid requests per month and this amount is still bound to grow. DSPs provide value by matching ad inventory offerings to advertiser requirements. As a result, the DSP servers evaluate large volumes of traffic in search of relevant ad inventory. While the RTB ad exchanges are mostly managing their demand sources without traffic flow tools, the DSPs are stuck with computing cost and scale problems that they cannot solve on their own.

The DSPs may be trying to meet the demands placed on them by increasing the amount of hardware in their data centers and simply "throttling" the bid stream, which ultimately leads to an increase in operational costs for DSPs. As used herein, as indicated by context, the term "bid stream" may comprise a bid request stream from an exchange. This may cut down on the amount of inventory seen, allowing a bid to happen quickly enough to complete a transaction, but makes no accommodation for the quality of inventory seen. The programmatic advertising industry exists in an Internet-age environment that demands highly sophisticated capabilities to isolate the user (e.g., ad buyers and ad inventory sellers) from the complexity of the intervening hardware and networking systems, while delivering highly reliable quality of service. However, these rudimentary hardware-centric attempts at solving what is a multi-faceted problem have significant consequences for the DSPs, digital ad inventory sellers, digital ad buyers, and the programmatic advertising industry as a whole. As a result of just attempting to push more data through existing network links, endpoints, and servers, or just adding more computing resources, most of the traffic that may be routed to DSPs constitutes non-relevant inventory. It may be assumed that of all the traffic that is sent to DSPs, only 5% of it may actually be usable to their ad inventory buyers. Also, a single bid request is automatically processed by all bidders across DSPs, even though there can only be one winner. Further, limited ad exchange tools to make specific inventory available and the lack of an optimization service for inventory across all ad exchanges forces DSPs to either spend massive amounts to listen to all bid streams or they are universally constrained. Thus, in some cases DSPs may only ingest a fraction of available inventory. This can limit digital media buyers' ability to bid on the most relevant inventory, as in such cases only a fraction of bid stream may be evaluated.

The ad exchanges on the other hand may make redundant calls into cloud services to push enormous inventory towards the DSPs, thereby taxing the computing, data storage, and networking systems of the cloud services unnecessarily. At present, the exchanges have limited abilities to filter and shape traffic and gain insights into their performance. Further, lack of insights causes the exchanges to process DSP bids even if they have no chance to win. In various contexts, depending on the desired outcome of a user, a "win" may comprise a winning bid, an impression, a view, a click, an action, or any performance indicator that is sought by the user of a DSP, and each of these should be understood to be encompassed by the term "win," except where context indicates otherwise. This results in increased operational costs, lost revenue, and an inability to send relevant traffic towards DSPs.

Currently, DSPs may need to spend significant resources to scale operation expenditure and capital expenditure. DSPs face an economic and technological burden for ingesting maximum queries per second (QPS) through their networks, servers, and data centers; yet as described above this alone may not provide an effective solution. Thus, there is a need to address the increasing cost and scale problems of the DSPs in an efficient manner.

There is a need to route only relevant and usable data traffic over already crowded networks towards DSP servers to eliminate their wasted computing, networking, and data storage capacity expenditure so they can put their focus on innovation and their core competencies rather than on building additional data centers.

SUMMARY

The present disclosure provides solutions to the computing, networking, and data storage problems of the present programmatic advertising industry infrastructure through a variety of technical capabilities embodied, for example in a Software-as-a-Service (SaaS) based platform that targets the specific needs of automating both buying and selling online ad inventory. The solutions described herein improve the performance of networks serving the programmatic advertising industry through controlling the data flowing through the networks based on use objectives of the data. By intelligently routing data through network links to endpoints based on the data content requirements of the endpoints (e.g., Demand-Side automatic programmatic advertising fulfillment Platforms), the network performance component of a programmatic advertising platform is improved by better utilizing the network capacity. Likewise, computing and data storage resources of these demand-side platforms (DSP) becomes highly efficient by handling ad offer and bid traffic that corresponds to requirements of the digital ads being automatically matched by the DSP to ad inventory, thereby improving computing performance that may be measured by bid response time metrics, ad inventory bid success rates, and the like. Data storage requirements can be significantly reduced when network traffic being routed to a DSP is targeted to the requirements of the electronic ad inventory buyers served by the DSP because fewer inventory offers need to be stored and processed. This results in increasing the performance of automated operations performed by the DSP servers to match ad inventory to digital ad requirements and further automatically secure matched ad inventory in response to real-time ad inventory offerings. The improvement in performance can be measured even as far downstream as an end user's web browser completing rendering of a composite web page that includes an advertisement automatically filled through a programmatic advertising platform employing these technical improvements. As network traffic and computing resources of the DSPs are optimized due to higher quality ad inventory being routed to the DSPs, the DSPs can be connected to even greater numbers of ad inventory exchanges. This may result in expanding the exposure of ad inventory to digital advertisers; effectively increasing overall automated programmatic advertisement performance for a given DSP computing/data center.

An embodiment of the SaaS platform of the present disclosure presents toggles and/or filters and algorithms to enable the buyers of ad inventory to automate getting the exact ad inventory traffic that they may need. The SaaS platform may be configured to be a neutral platform such that both the buyers and the sellers may be able to get on the platform and set the toggles as they want. The neutrality of the platform may enable the programmers and users of the platform to add products and services modularly and diversely, across the programmatic advertising industry. References to "toggles," "filters" and the like should be understood to comprise various mechanisms for allowing user control over one or more parameters, whether involving binary (e.g., on/off) elements or continuous elements (e.g., allowing user control over a weight attributed to a parameter), and may be embodiment in or take input from various menu elements, buttons, sliders, tables and the like, and references in this disclosure to toggles, filters and the like should be understood to encompass all of the above, except where context indicates otherwise.

The exemplary SaaS platform provided herein may be configured to provide a lightweight distributed architecture to listen to an entire bid stream during an advertising transaction and provides toggles to match the supply to the demand. The architecture of the SaaS platform may be configured to include a plurality of components that may be configured to implement the platform as an algorithm driven software switch platform.

The SaaS platform may also be configured to offer an interactive user interface to configure toggle settings. Using the interactive user interface of the SaaS platform, both the DSPs and the RTB ad exchanges may be enabled to set maximum capacity and traffic characteristics to match advertising campaign needs. In an example, the SaaS platform may be configured to provide an algorithm that may allow automatic settings for various toggles and traffic conditions. Using a combination of toggles and algorithms, the SaaS platform may, in various embodiments, enable managing of real-time bidding requests across a plurality of digital media. The algorithms disclosed provide optional advanced analytics and machine learning capabilities to match supply side and demand side requirements.

The SaaS platform disclosed herein may be configured to lessen the complexity of programmatic inventory and enable the advertisers to leverage the programmatic features of the platform to connect with their consumers. The SaaS platform may also enable connecting each DSP with as many exchanges as possible in order to gain a comprehensive cross-section of media inventory. At the same time, the SaaS platform may also enable multiple exchanges to integrate with as many new DSPs as possible.

The SaaS platform may be configured to listen to the full bid stream and toggle the inventory for the DSPs using manual and algorithmic means so that the demand side receives bid requests for impression opportunities that match the requirements of their advertisers. Using the SaaS platform, the DSPs are saved with the effort of processing large volumes of non-relevant traffic and only pay for infrastructure needed to process bid requests that they actually need. Thus, the DSPs may benefit from deploying the SaaS platform by being able to win a higher percentage of bids and get better and more qualified bid requests.

The SaaS platform may also offer benefits for the RTB ad exchanges, as they can better control which inventory is sent to each buyer, allowing improved yield by not sending the same streams of inventory to each buyer. The result is buyers compete on inventory that they can use and the exchanges limit their wasted bandwidth for non-monetizing buyers.

Thus, the SaaS platform may be configured to simplify the programmatic experience for both supply side and demand side by becoming the integration focal point. DSPs may be able to add new inventory as it becomes available without building new infrastructure to support even a fraction of it. The rules DSPs setup for bid streams can apply to one or all exchanges. Exchanges may benefit by managing integration and obtaining an ever-increasing market for their inventory as new DSPs are added through the SaaS platform. Both sides leverage increased scale without additional infrastructure and stress on internal infrastructure.

The SaaS platform may be configured to provide full transparency and control to both the DSPs and the RTB ad exchanges. While the RTB ad exchanges may be able to determine which inventory is provisioned to buyers, the buyers set the inventory to be toggled to their systems. The SaaS platform does not need to clear media nor does it need to influence the exchange auction dynamics, but such activities could occur in conjunction with alternative embodiments. Buyers and sellers may be able to maintain contractual, financial and account management relationships.

A network traffic management computing platform, distributed within a programmatic advertising infrastructure, configured to route digital advertisement inventory data traffic items from advertisement real-time exchange servers over one or more networks to demand side platform servers, the traffic items being selected by applying traffic handling algorithms based on data traffic activity and demand side platform traffic constraints and applying traffic toggling algorithms based on similarity of content of discrete digital advertisement inventory data traffic items to demand side automated digital advertising inventory matching criteria for meeting digital advertiser online advertisement placement requirements, and to route data representing a bid for the automatically matched digital advertisement inventory item to an originating advertisement real-time exchange server of the inventory item.

In embodiments, a system to control programmatic advertising traffic provides to a demand-side platform (DSP) server a desired amount and type of digital advertisement inventory data traffic from at least one real-time-bidding (RTB) advertising exchange The system includes a network traffic management computing platform that receives the digital advertisement inventory data traffic over at least one network. The system also includes a toggle component of the network traffic management computing platform that restricts delivery of a portion and routes delivery of an unrestricted portion of the digital advertisement inventory data traffic to the DSP server based on pre-selected parameters. The toggle component also routes data representing a bid to the at least one RTB advertising exchange associated with the unrestricted portion of the digital advertisement inventory data traffic delivered to the at least one DSP server.

In embodiments, the toggle component of the network traffic management computing platform includes a set of toggles having at least one toggle related to at least one of the pre-selected parameters associated with characteristics of at least one of advertising traffic and an audience for the advertising traffic. Adjusting the at least one toggle results in at least one of restricting and permitting delivery of a portion of the digital advertisement inventory data traffic to the at least one DSP server based on the extent to which the traffic is characterized by the pre-selected parameters. In various embodiments, any of the toggles described herein may be configured as a restricting toggle or a permitting toggle, depending on the requirements of a given user, such as a user of a DSP.

In embodiments, the further adjusting of the at least one toggle results in at least one of further restricting and newly permitting delivery of a portion of the digital advertisement inventory data traffic to the at least one DSP server based on the pre-selected parameters.

In embodiments, the toggle component of the network traffic management computing platform includes a set of toggles having at least one origin toggle related to at least one of the pre-selected parameters associated with origin characteristics of the advertising traffic.

In embodiments, the toggle component of the network traffic management computing platform includes a set of toggles having at least one viewability toggle related to at least one of the pre-selected parameters associated with viewability characteristics of the advertising traffic relative to configurations of computing devices that receive the advertising traffic.

In embodiments, the toggle component permits delivery of a portion of the digital advertisement inventory data traffic having desired viewability characteristics to the at least one DSP server.

In embodiments, the toggle component restricts delivery of the digital advertising inventory data traffic lacking in desired viewability characteristics from delivery to the at least one DSP server.

In embodiments, the toggle component of the network traffic management computing platform includes a set of toggles having at least one audience toggle related to at least one of the pre-selected parameters associated with audience characteristics of the advertising traffic relative to the audience for the advertising traffic.

In embodiments, the toggle component of the network traffic management computing platform includes a set of toggles having at least one fraud protection toggle related to at least one of the pre-selected parameters associated with detection of an indicator of fraud with respect to at least a portion of a bid stream associated with at least one of the digital advertisement inventory data traffic and the at least one RTB ad exchange.

In embodiments, the system includes an automatic settlement module of the network traffic management computing platform that connects to a server of a financial platform to clear transactions for delivery of advertising inventory between the at least one DSP server the at least one RTB ad exchange.

In embodiments, the system includes an optimization module of the network traffic management computing platform that surveys the digital advertisement inventory data traffic between a plurality of DSP servers and RTB ad exchanges and that tunes a set of toggles over time to improve a pre-selected parameter associated with delivery of the advertising inventory to the DSP server.

In embodiments, the optimization module tunes the set of toggles over time to improve a click-through rate (CTR) parameter associated with delivery of the advertising inventory to the DSP server.

In embodiments, the system includes an optimization module of the network traffic management computing platform that surveys the digital advertisement inventory data traffic between a plurality of DSP servers and RTB ad exchanges and automatically re-balances delivery of a portion of the digital advertisement inventory data traffic to a DSP based on a pre-selected parameter.

In embodiments, the system includes an optimization module of the network traffic management computing platform that surveys the digital advertisement inventory data traffic between a plurality of DSP servers and RTB ad exchanges and automatically shapes delivery of a portion of the digital advertisement inventory data traffic to the DSP server based on at least one of a pre-selected parameter.

In embodiments, the at least one pre-selected parameter on which the optimization module automatically shapes delivery of a portion of the digital advertisement inventory data traffic to the DSP server is selected from a group consisting of a win rate parameter, an ad impression parameter, a click-through rate parameter, and a conversion rate parameter. In embodiments, the at least one pre-selected parameter on which the optimization module automatically shapes delivery of a portion of the digital advertisement inventory data traffic to the DSP server is at least one of a win rate parameter, an ad impression parameter, a click-through rate parameter, a conversion rate parameter, and combinations thereof.

In embodiments, the optimization module is configured to be connected with a machine learning module to access machine learning resources to automatically re-shape delivery of the portion of the digital advertisement inventory data traffic to the DSP server based on the at least one pre-selected parameter.

In embodiments, the at least one pre-selected parameter on which the optimization module accesses the machine learning resources to automatically re-shape delivery of a portion of the digital advertisement inventory data traffic to the DSP server is selected from a group consisting of a bidding parameter, a win rate parameter, an ad impression parameter, a click-through rate parameter, and a conversion rate parameter. In embodiments, the at least one pre-selected parameter on which the optimization module accesses the machine learning resources to automatically re-shape delivery of a portion of the digital advertisement inventory data traffic to the DSP server is at least one of a bidding parameter, a win rate parameter, an ad impression parameter, a click-through rate parameter, a conversion rate parameter, and combinations thereof, as well as other parameters that would be known to one of skill in the art.

In embodiments, the optimization module is configured to connected with a machine learning module to access machine learning resources to automatically re-shape delivery of the portion of the digital advertisement inventory data traffic to the DSP server based on the at least one pre-selected parameter. By applying machine learning machines within the systems described herein, the mix of traffic can be optimized for each user of the platform based on various signals received by the platform. This enables substantial improvements in the return-on-investment (ROI) for each customer on its advertising spending. Automating the process enables very substantial increases in the scale of transactions handled by the platform, such as enabling 100,000 transactions per second, 500,000 transactions per second, 1,000,000 transactions per second, or more.

In embodiments, the optimization module automatically scales a number of cloud computing resources when it automatically shapes delivery of a portion of the digital advertisement inventory data traffic to the DSP server based on at least one of a pre-selected parameter.

In embodiments, the system includes a toggle creation module of the network traffic management computing platform that creates toggles configured to be manipulated through an associated visual UI component, each of the toggles is related to at least one pre-selected parameter and each of the toggles alters what portion of the digital advertisement inventory data traffic is restricted from being delivered to the DSP server.

In embodiments, the at least one pre-selected parameter on which each of the toggles alters what portion of the digital advertisement inventory data traffic is restricted from being delivered to the DSP server is selected from a group consisting of a handset parameter, an operating system parameter, a device ID parameter, a location parameter, a type of carrier parameter, and a session depth parameter. In embodiments, the at least one pre-selected parameter on which each of the toggles alters what portion of the digital advertisement inventory data traffic is restricted from being delivered to the DSP server is at least one of a handset parameter, an operating system parameter, a device ID parameter, a location parameter, a type of carrier parameter, a session depth parameter, and combinations thereof.

In embodiments, the network traffic management computing platform is provided as a software-as-a-service-platform disposed between the at least one DSP server and the at least one RTB ad exchange.

In embodiments, a device ID parameter, or any other parameter that is associated with a particular user (such as ones that are available in or from a mobile application or a browser), may allow the platform to be extended to automate generation of a user list, such as a list of high value users. Automated user list generation (either in combination with other parameters or as a standalone parameter) may allow identification of a set of valuable users, so that traffic may be shaped to provide a higher concentration of high value users within the permitted/toggled traffic. Value may take various forms according to the preferences of a user of a DSP, such as based on click rates, conversions, impressions, and others.

In embodiments, the at least one toggle component comprises a set of toggles that includes toggles each related to a different RTB ad exchange, and wherein the at least one toggle component restricts a portion of the digital advertisement inventory data traffic from being delivered to the DSP server when it is redundant to digital advertisement inventory data traffic that has already been delivered from a different RTB advertising exchange.

In embodiments, the at least one toggle component is associated with a pre-selected list of RTB ad exchanges, and wherein the toggle component only permits a portion of the digital advertisement inventory data traffic from being delivered to the DSP server when its origin is from at least one of the pre-selected list of RTB exchanges.

In embodiments, the at least one toggle component comprises a set of toggles that includes at least one toggle related to an amount of bids, and wherein the toggle component permits delivery of a portion of the digital advertisement inventory data traffic to the server of the DSP only when the amount of bids is less than a preselected amount.

In embodiments, the set of toggles includes toggles each related to a different RTB ad exchange, and wherein the toggle component permits delivery of a portion of the digital advertisement inventory data traffic to the DSP server when its origin is from any one of the different RTB ad exchanges and the amount of bids is less than the preselected amount.

BRIEF DESCRIPTION OF THE FIGURES

The disclosure and the following detailed description of certain embodiments thereof may be understood with reference to the following figures:

FIG. 9 illustrates screen shot depicting a settlement report that provides information about transactions that were executed using the platform for programmatic advertising in accordance with an embodiment of the present disclosure.

FIG. 10 illustrates an example of a report on filtered and available traffic for various types of device for programmatic advertising transactions in accordance with an embodiment of the present disclosure.

DETAILED DESCRIPTION

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having", as used herein, are defined as comprising (i.e., open transition).

Figure 1:
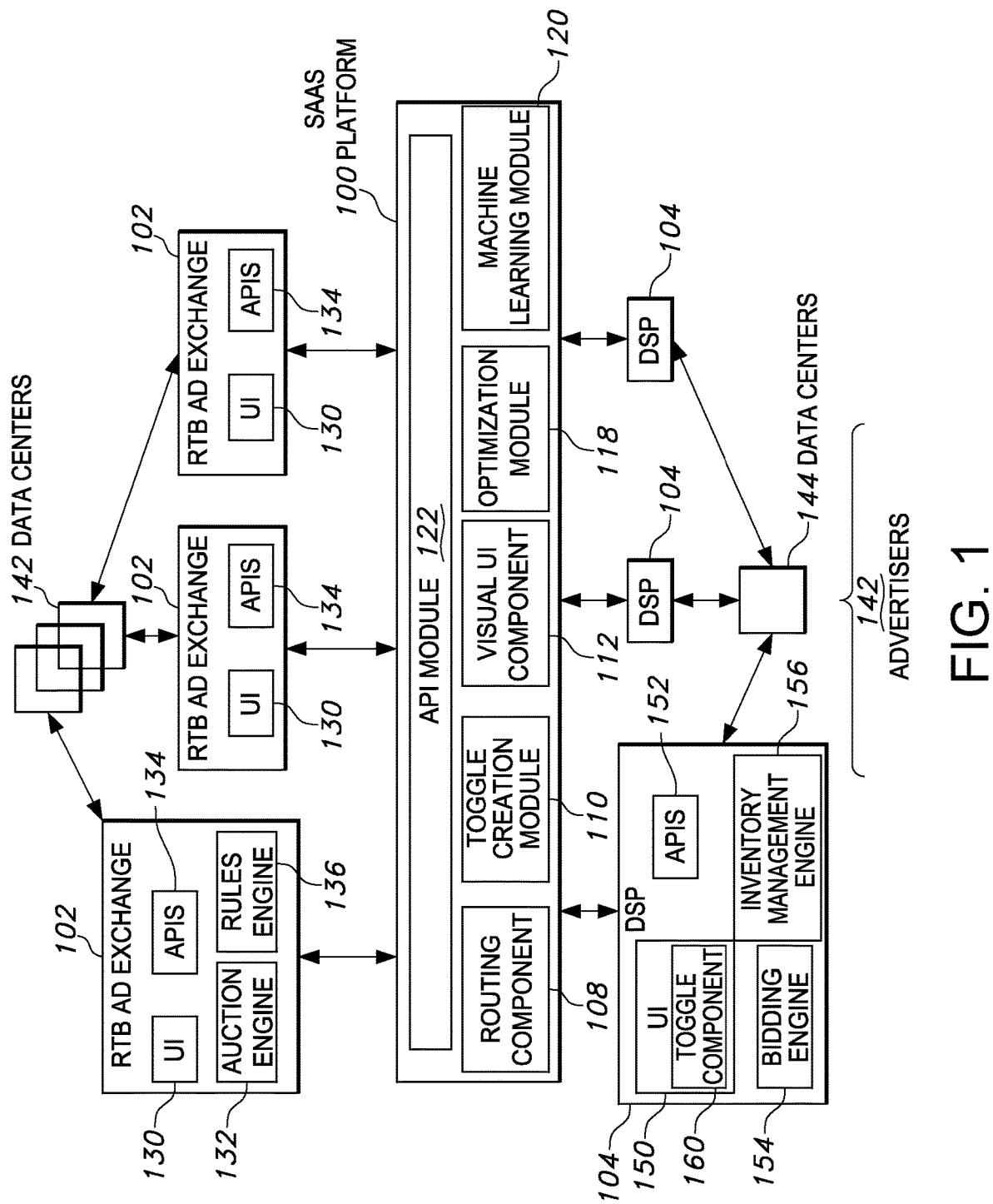
FIG. 1 illustrates an exemplary architecture for a platform for programmatic advertising in accordance with an embodiment of the present disclosure.

FIG. 1 is a schematic diagram illustrating generally, among other things, an example of the architecture of a platform for programmatic advertising in accordance with an embodiment of the present disclosure.

The architecture of FIG. 1 may include a Software-as-a-Service (SaaS) Platform 100 (hereinafter referred to as the SaaS platform), interfacing with a plurality of real-time bidding (RTB) advertising exchanges 102 (hereinafter referred to as the RTB ad exchanges) and a plurality of demand-side platforms (DSPs) 104. The SaaS platform 100 of FIG. 1 may be configured to route bid request and bid response traffic to and from the RTB ad exchanges 102 to achieve a desired mix of traffic for the users of the DSPs 104.

The SaaS platform 100 may include a routing component 108, a toggle creation module 110, a visual user interface (UI) component 112, an optimization module 118, a machine learning module 120, and an interface module 122. A routing component 108 may be embodied as a software module or appliance. An interface module 122 may be configured as an Application Programming Interface (API).

In an example, the SaaS platform 100 may be configured to enable users of the plurality of DSPs 104 for programmatic advertising to toggle traffic in order to receive a desired amount and type of traffic from any of the plurality of RTB ad exchanges 102.

In an example, the SaaS platform 100 may be configured to process the full programmatic stream itself while at the same time allowing the RTB ad exchanges 102 to provision out a part of their inventory to the DSPs 104. Further, the SaaS platform 100 may enable the DSPs 104 to set toggles on the type of inventory in the form of a type of traffic they may receive. The toggles may work in consonance with a plurality of algorithms provided by the SaaS platform 100 to match the specific demands of the DSPs 104 with the bid streams supplied by the RTB ad exchanges 102, in order to enable the DSPs 104 to increase their probability to win auctions for ad spaces set up by the RTB ad exchanges 102.

The toggles may define multiple attributes of the bid streams sent by the RTB ad exchanges 102.

Each of the RTB ad exchanges 102 may include a plurality of components, including but not limited to, a UI component 130, an auction engine 132, a set of APIs 134 for accessing the functions of the RTB ad exchanges 102 and a rules engine 136.

Users of the RTB ad exchanges 102 to configure data related to auctioning of ads using the RTB ad exchanges 102 may use the UI component 130 of the RTB ad exchanges 102. In an example, the data may include ad-related data, such as auctioned value of ad space. In another example, the data may be related to other ad attributes that may be advertised at the time of auctioning off ad inventory by the RTB ad exchanges 102.

Each of the plurality of RTB ad exchanges 102 may include the auction engine 132 that may be used to manage auctioning off ad space using the RTB ad exchanges 102. For example, the auction engine 132 may be configured to manage advertising of an ad space for auction, receiving bids on the auctioned ad space, sending notifications regarding the success of a bid, and the like. The success or failure of a bid may be determined based on the analysis and computations performed on the bid prices received from the plurality of DSPs 104. To augment information obtained regarding bid prices, the platform may obtain a feed of information regarding clearing prices from a DSP, the fact that an auction was won, or the like. This can be used, along with bid price prices, to compute the probability of success or failure of a request if transmitted to the DSP. Success of a win can be determined by receiving indicators of wins directly form the RTB ad exchange, or from the DSP in various methods.

The rules engine 136 may be configured to perform computations on the bid related data received by the auction engine 132 and determine the winning bid based on a plurality of constraints. In an example, the plurality of constraints may be provided by the advertisers of the ad spaces.

The APIs 134 may be configured to provide a plurality of interfaces for accessing data related to various functional components of the plurality of RTB ad exchanges 102. The plurality of RTB ad exchanges 102 may further be connected to a plurality of data centers 140. The data centers 140 may be configured to store and manage data related to auctioning off ad spaces by a plurality of publishers or advertisers 142 on the programmatic advertising platform.

An RTB ad exchange 102 may enable publishers of ad spaces to manage their advertising inventory. RTB ad exchanges 102 offer an efficient, automated and secure way to tap into different available advertising sources (ad networks, DSPs, other supply side platforms (SSPs)) and to provide insight into the various revenue streams and audiences. The UI component 130 of the RTB ad exchange 102 may facilitate the buying and selling of online media advertising inventory whose prices are determined through bidding. Some exchanges may allow their users or publishers to compete with the yield from ad networks; others may run a super auction, comparing yield at impression time across ad networks and the exchange. If DSPs are the "brains" of the programmatic ad world, exchanges are the "brawn".

Mostly the exchanges depend upon the DSPs 104 to filter the advertising traffic. However, with the use of the SaaS platform 100, the RTB ad exchanges 102 may be configured to intelligently and efficiently manage sending relevant bid streams to DSPs 104 and thus throttle based on a percentage that aligns with an agreed upon query per second (QPS).

In programmatic advertising, ad exchanges, such as each of the plurality of RTB ad exchanges 102 illustrated in FIG.

1, send impression opportunities, called bid requests, to the connected demand side platforms, such as each of the plurality of DSPs 104. The DSPs 104, in turn, respond with a bid price value, such as a maximum bid price for the impression during a process called as auctioning of advertisement spaces, or ad inventory by an RTB ad exchange 102. The DSPs 104 send their bids with an aim of winning an auction and gathering as much ad inventory as possible. The ad inventory accumulated by the DSPs 104 may be used by ad agencies or advertisers for placing their ads on the auctioned ad spaces.

In an example, each of the RTB ad exchanges 102 may run a second price auction to determine the winner and the amount to pay. The winner is the highest bidder and pays a predetermined amount, such as USD $0.01 higher than the next highest bidder. For example, if the top bid is for USD $1.50 and the second place bid is for USD $0.99, the winner pays USD $1.00.

The DSPs 104 may send bids with a price that has the highest chances of winning an auction. Also, the acquired ad inventory has to be properly managed for efficient ad placement by advertisers.

Each of the plurality of DSPs 104 illustrated in FIG. 1 may be connected to one or more data centers 144 that may further be connected to a plurality of advertisers that act as the users of the DSPs 104. Each of the plurality of DSPs 104 may include a plurality of components that may enable the DSPs 104 to perform a plurality of functions of programmatic advertising, including but not limited to ad placement, bidding for ad spaces, ad inventory management and retargeting of ads.

Each of the DSPs in the plurality of DSPs 104 may further include a UI component 150, a set of APIs 152, a bidding engine 154, and an inventory management engine 156. The UI component 150 may further include a toggle component 160, which may be used to set toggles on the advertisement related traffic received by the DSPs 104 using the SaaS platform 100. The UI component 150 may further include a plurality of other components that may be used to set and access bid related information by the buyers of ad spaces of the programmatic advertising platform.

The set of APIs 152 may be used to interface with the SaaS platform 100 through a set of API calls. The API calls may enable the DSPs 104 to access the plurality of functionalities of the SaaS platform 100. In an example, the API calls may be configured to interface with the SaaS platform 100 to allow toggling or filtering of traffic related to bid requests received by the DSPs 104 in order to receive a desired amount and type of traffic.

The bidding engine 154 of the DSPs 104 may be configured to perform a plurality of bidding-related functions, such as receiving of bid requests from the RTB ad exchanges 102, sending bid responses to the RTB ad exchanges 102 and functions related to targeting the RTB ad exchanges 102 for collecting ad inventory. While sending out the bid responses, the bidding engine 154 aims to maximum the possibilities of winning the auctions for ad inventory.

In an example, the bidding engine 154 may be configured to receive only desired amount of traffic from the RTB ad exchanges 132 using the routing component 108 of the SaaS platform 100. The SaaS platform may act as an interface between the plurality of RTB ad exchanges 102 and the plurality of DSPs 104 and send only desired traffic to the plurality of DSPs 104. The traffic may be filtered based on a plurality of parameters, including but not limited to page context, ad placement, publisher profile, buyer user profile, buyer look-a-like modeling, ad format, location, frequency cap, session depth, click probability, conversion rate, bid winning dynamics and the like.

The bidding engine 154 may be configured to manage data related to the plurality of parameters associated with the bidding request. The bidding engine 154 may further be configured to receive bid requests and send bid responses to from ad exchanges. In an example, the sending of bid response may be performed on the basis of analysis of various parameters associated with the bid. In an example, the bidding engine 154 may be configured to execute a plurality of algorithms to determine a bidding price to send for a bid response from the DSP 104 to a RTB ad exchange 102.

The success of the DSP 104 in an auction, based on the bidding price may result in the allocation of ad inventory to the DSP 104 that may be managed by the inventory management engine 156.

The data, including ad inventory of all the DSPs 104 may be stored and managed within one or more data centers 144 that may be accessed by a plurality of advertisers or ad agencies that serve as buyers of the ad inventory using the DSPs 104, which in turn access the traffic routed by using the routing component 108 of the SaaS platform 100.

The DSPs 104 may be configured to allow a plurality of buyers of advertising spaces to manage access to multiple RTB ad exchanges 102 through a single user interface, such as the UI component 150 of each of the plurality of DSPs 104. The RTB ad exchanges 102 set up auctions for ad inventory, during which real-time bidding by various DSPs 104 takes place. The bidding engine 154 enables the DSPs 104 to manage their bid and the associated data layered onto target audiences. The use of DSPs 104 may allow buyers or advertisers to optimize their bidding based on set key performance indicators such as effective Cost per Click (eCPC), and effective Cost per Action (eCPA), and the like. Further, the DSPs 104 may offer sophisticated tools, proprietary and licensed datasets and optimized pricing to the buyers of ad inventory. DSPs 104 pitch performance techniques such as retargeting, cross-device targeting and measurement, audience targeting (for example, based on intended demographic, lifestyle, and brand affinity), location targeting, and others. The DSPs 104 may use a plurality of algorithms to identify the effect of an ad on the buyers. In an example, the algorithms may be executed by the bidding engine 154 before sending out a bidding response to a RTB ad exchange. 102 The DSPs 104 may need to make a decision about a bid in a matter of milliseconds at massive scale. In an example, the decision making may be based on a plurality of factors including, but not limited to, page context, ad placement, publisher or exchange user profile, buyer user profile (first and third party data), buyer look-a-like modelling (first and third data, retargeting user lists), ad format, location, frequency cap, session depth, click probability, conversion or other post-click metric probability, and exchange marketplace pricing and win dynamics. In an example, the SaaS platform 100 may enable the plurality of DSPs 104 to set toggles on the type of traffic they receive from the RTB ad exchanges 102 based on any of the above-mentioned factors. In an example, the toggles may be set using the toggle creation component 1501 of each of the DSPs 104. In an example, setting up the toggles may enable the DSPs 104 to identify the most profitable bid requests for them.

Generally, the DSPs 104 may connect with multiple RTB ad exchanges 102 and listen to as many of bid requests as possible in order to be able to find a suitable bid request. Generally, for any given bid request, there are likely tens or hundreds of competitors. However, since there can only be one bidder that can win each auction, this results in a lot of "wasted" computation effort, bandwidth and infrastructure across the DSPs 104.

However, using the SaaS platform 100, the DSPs 104 may be able to receive the most appropriate traffic routed towards them, based on their preferred toggle factors.

In an example, the routing component 108 of the SaaS platform 100 may be configured to execute a plurality of algorithms that may enable routing appropriate bid traffic from the RTB ad exchanges 102 to the DSPs 104.

When a bid request enters the SaaS platform 100, the routing component 108 parses the features, looks up session depth and makes a route decision based on the algorithms. A request passes through to the DSP 104 for bidding if the toggle parameters match the bid request features and desired transaction levels. A no bid response follows inventory that does not match toggles from DSPs 104 leveraging the routing component 108. In an example, the toggle parameters are specified either manually or automatically in the visual UI component 112, and their configurations are pushed from the visual UI component 112 to the routing component 108.

In an example, the routing component 108 may be implemented as a software appliance that is described elsewhere herein. In another example, each of the plurality of DSPs 104 may implement its own instance of the routing component 108. In another example, each of these routing components may then be linked to each other.

In an example, instances of the routing component 108 may be implemented in both the RTB ad exchanges 102 and the data centers 144 of the plurality of DSPs 104. The routing component 108 may determine whether a bid request needs to go to a particular data center 128, takes the bid request to the data center 128, decides there where bid requests should go, gets bids, and returns bid responses to the instance of the routing component 108 at the RTB ad exchange. Having the instances of the routing component 108 on both sides allows the use of compression, which gives bandwidth efficiency to the bidding process. This is replayed across all the data centers and all of the exchanges. Thus all the bid requests and bid responses pass through the routing component 108 at the SaaS platform 100. Further, the routing component 108 may enable using third party providers to further add value to the bidding process. These third-party providers may include elements such as data management platforms (for example, Oracle, Adobe, and Nielsen), viewability vendors (for example, Integral Ad Sciences, and Moat), and fraud detection technologies. In an example, these value-added features may also be used to toggle traffic. Some of the scenarios using these services as toggle parameters may include, for example, only allowing elements through that come from a certain data management platform, only allowing elements through that have 70% view-ability, only allowing elements through that pass fraud detection, and the like.

Thus, the routing component 108 may shape the traffic coming from RTB ad exchanges 102 before routing it to the DSPs 104, based on the configured toggles. The configurations of the toggles may be pushed from the visual UI component 112 to the routing component 108, with the changes to configurations taking place in real-time. The toggles may be configured using the toggle creation module 110 module of the SaaS platform 100.

The SaaS platform 100 may include the toggle creation module 110, which may be configured to enable the creation of toggles or filters on the traffic exchanged between the plurality of RTB ad exchanges 102 and the plurality of DSPs 104. The toggles may define certain constraints on the traffic that may be routed between the plurality of RTB ad exchanges 102 and the plurality of DSPs 104. In an example, the toggles may be created using the visual UI component 112 of the SaaS platform 100. The visual UI component 112 may be configured to provide an interface to the users of the SaaS platform 100 to manage traffic based on a plurality of parameters. In an example, the parameters may include, but are not limited to, a handset, operating system, device ID, location, type of carrier, session depth, and the like.

In an example, the plurality of parameters may be used to perform optimization of traffic exchanged between the plurality of RTB ad exchanges 102 and the plurality of DSPs 104. The optimization module 118 may be configured to perform optimization related functions on the traffic exchanged between the plurality of RTB ad exchanges 102 and the plurality of DSPs 104. In an example, the functions may include, but are not limited to, traffic forecasting, automated traffic shaping, automatic re-balancing, automated scaling module, automated settlement and the like. In an example, the optimization of traffic and other functions of the optimization module 118 may be performed based on a plurality of machine learning algorithms executed by the machine learning module 120.

The SaaS platform 100 may further include a set of interface modules 122 for interfacing with the data centers of both the plurality of RTB ad exchanges 102 and the plurality of DSPs 104, for the exchange of optimum traffic between the plurality of RTB ad exchanges 102 and the plurality of DSPs 104. In an example, the set of interface modules 122 may enable toggling of traffic between the plurality of RTB ad exchanges 102 and the plurality of DSPs 104 using the visual UI component 112.

Figure 2:
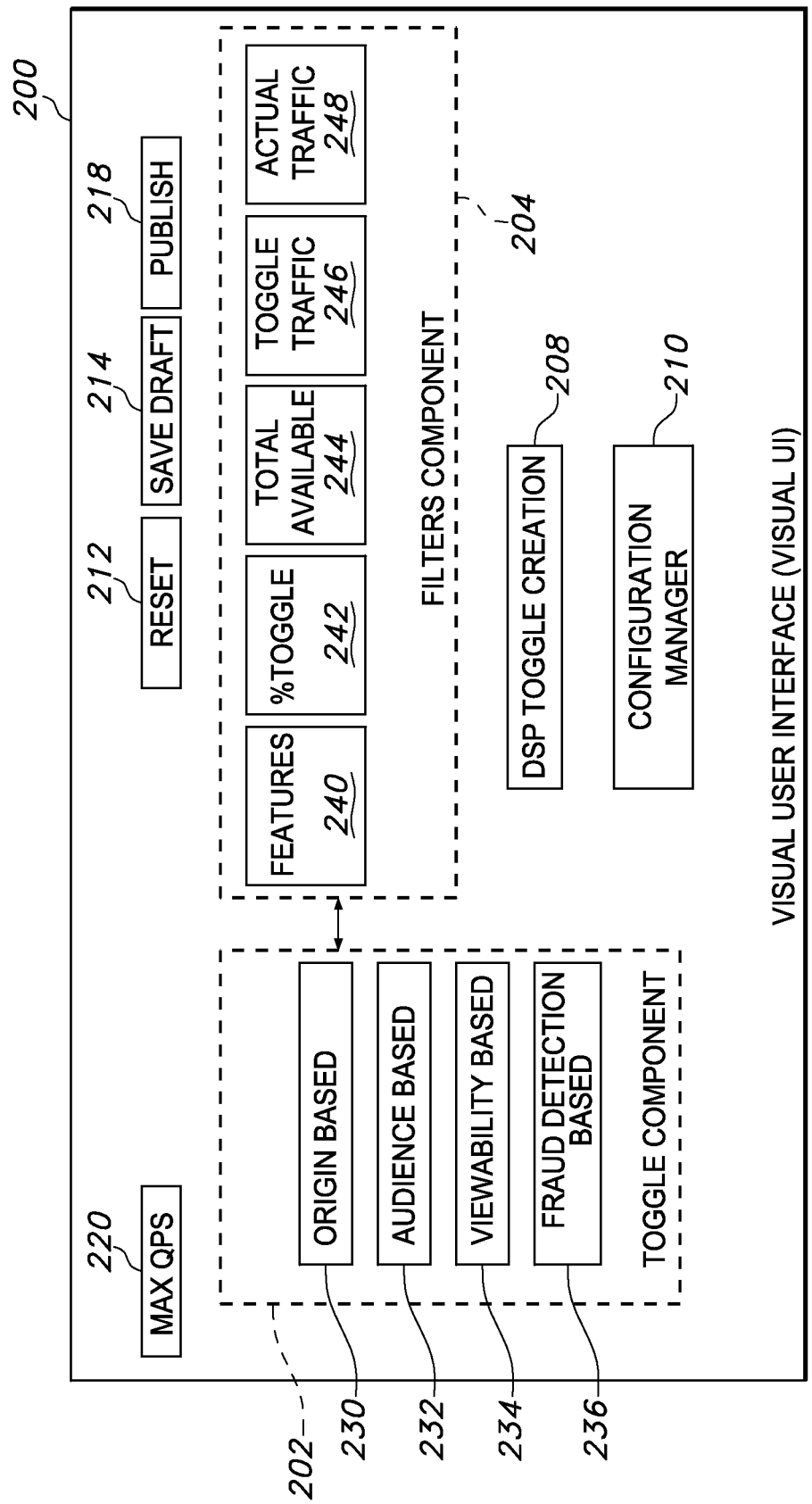
FIG. 2 illustrates an exemplary embodiment of a user interface for the platform for programmatic advertising in accordance with an embodiment of the present disclosure.

FIG. 2 illustrates an exemplary embodiment of a visual user interface (Visual UI) 200 for the SaaS platform 100 for programmatic advertising in accordance with an embodiment of the present disclosure.

In an example, the Visual UI 200 may be the visual UI component 112 of the SaaS platform 100. The Visual UI 200 may enable users of the SaaS platform 100 to toggle and filter advertising traffic in order to receive a desired amount and type of traffic. In an example, the Visual UI 200 may be a platform neutral user interface, such as it may be deployable by both the plurality of DSPs 104 as well as the plurality of RTB ad exchanges 102.

The exemplary Visual UI 200 may include a plurality of visual interface components such as depicted in the FIG. 2. These components may include, but are not limited to, a toggle component 202, a filter component 204, a DSP toggle create component 208, a configuration manager 210, a reset button 212, a save draft button 214, a publish button 218, and a max QPS field 220. The components depicted in FIG. 2 are for exemplary purpose only. The Visual UI 200 may include other components as well, according to some other embodiments that may be clear to a person of ordinary skill in the art.

The toggle component 202 may include a plurality of toggle parameters on the basis of which a user of the SaaS platform 100 may be able to toggle the advertising traffic in order to receive a desired amount and type of traffic. In an example, the plurality of toggle parameters may be implemented in the form of buttons on the Visual UI 200, on which the user may be able to click, to select a particular toggle parameter. In other examples, some other forms of representing the toggle parameters may also be used. Selecting any of the one or more toggle parameters may be used to toggle the advertising traffic. For example, the toggle component 202 includes four parameters (origin based 230, audience based 232, view-ability based 234, and fraud detection based 236) that may be used to toggle the advertising traffic by the users of the SaaS platform 100. The toggle component 202 may include parameters for toggling that may include toggling that may be origin based 230, audience based 232, viewability based 234, and fraud detection based 236. Put another way, the toggle component 202 may include parameters for toggling that may include one or more origin toggles, audience toggles, viewability toggles, fraud detection toggles, and combinations thereof.

In an example, the users of the SaaS platform 100 may be able to toggle the advertising traffic based on the origin of the traffic, using the origin based toggle 230. For example, a DSP 104 may want to receive bid requests originating from a preferred list of RTB ad exchanges 102. In this scenario, the DSP 104 may set toggles on the desired originators.

In an example, the users of the SaaS platform 100 may be able to toggle the advertising traffic based on the characteristics of the desired audience of the advertising traffic, using the audience based toggle 232. For example, a DSP 104 that may be catering to an e-commerce website of a clothing company may want to target their advertisements to a young audience in the 30 and below age group. Thus, the DSP 104 may want to restrict the traffic coming towards it only from websites that are more popular with the young audience of their choice.

In an example, the users of the SaaS platform 100 may be able to toggle the advertising traffic based on the extent of view-ability the traffic, using the view-ability based toggle 234. For example, a DSP 104 may want to restrict traffic to sources that typically satisfy a viewability metric.

In an example, the users of the SaaS platform 100 may be able to toggle the advertising traffic based on the extent to which the advertising traffic has been subject to fraud detection, using the fraud detection based toggle 236. For example, the traffic that may have been subjected to fraud detection may intuitively be assumed as malicious content, and thus may be blocked by setting appropriate toggles.

The examples illustrated in the FIG. 2 are for exemplary purpose only. The Visual UI 200 may also include other toggle parameters, such as handset based toggling, ad placement location based toggling, toggling based on the type of operating system, and the like.

The toggle parameters may be provided in the form of an interactive and intuitive user interface to the users of the SaaS platform 100. The users may be able to select one or more toggle parameters (including combinations of parameters) based on their choice and requirements. In an example, the users may be able to toggle the available parameters manually, such as by clicking on the desired toggle buttons only and leaving the undesired toggles unclicked, by moving toggle sliders into desired positions, or the like. In other examples, the toggle parameters may be automatically selected based on an analysis of predefined user choices and requirements. The analysis of users' choices may be done based on machine learning algorithms, such as by the machine learning module 120 of the SaaS platform 100. In an example, the users may be able to specify their choices by creating new toggle parameters. For example, each of the plurality of DSPs 104 may be able to specify their choice of toggle parameters by using the DSP toggle creation component 208 of the Visual UI 200. The configurations of all the toggle parameters, whether predefined or newly created, may be managed internally by the Visual UI 200, using the configuration manager 210. In an example, the configurations of the toggle parameters may be defined automatically by the configuration manager 210 using a set of high-level APIs, such as the sparkML package. The configurations of the toggle parameters may be updated within the Visual UI 200 and then pushed out to the routing component 108 of the SaaS platform 100.

In an example, the toggle parameters may be selected from the attributes found in bid request metadata and may include handset operating system, device ID applications and sites, ad format, ad size, location carrier Wi-Fi/GPS, user lists, session depth, and the like. Once a toggle parameter has been selected, it may further be classified into a plurality of features, such as the specific items that are toggled. For example, for handset toggle, the parameters may include such as for iPhone 6.0, for ad size 300×350, dimensions may be specified, and the like. The toggle parameters may be toggled based on their attributes, using the labels provided in the filters component 204. Some of the toggle parameters may be defined as below.

In an example, a session depth may be defined as the amounts of ads that have been seen by a system in a given time frame, such as a minute, a fraction of an hour, an hour, a day, or the like, such as by the SaaS platform 100.

In an example, settings may be defined as ways of setting anything new that comes into the system.

In an example, forecasting may be defined as what is available and what are toggles being set for.

In an example, a location may define specific countries for toggle. For example, a user may set a toggle that may specify that from all of Europe they want X amount of traffic, for the US, the want Y amount, and the like.

In an example, size may define traffic as percentages or a slice of what is available for a particular constraint.

In an example, an ad format may define the types of ads that can be sent for some requests. For example, some requests may only take a banner, others may take video, rich media, native or interstitial (full page ads), and the like.

In an example, apps may specify that traffic may be routed based on the application.

In an example, a device ID may define such as if the device is Apple or Android ID, or the like.

In an example, an operating system may specify different versions of the operating system. The toggles may enable a user to target traffic for each version in the right percentage.

In the example of FIG. 2, the filters component 204 may include a plurality of labels such as features 240, % toggle 242, total available traffic 244, toggled traffic 246, and actual traffic 204e. The labels of the filters component 204 may enable a specific value for each of the different attributes of each of the toggle parameters. For example, the feature label may help a user to select a specific feature of the toggle component. Such as for the toggle parameter handset, the feature label may include different types of handsets, such as Samsung, Motorola, iPhone, and the like. The traffic for each feature may be toggle based on a range specified by the % toggle 242 label. Further, the labels total available traffic 244, toggled traffic 246, and actual traffic 204e may display the actual volumetric measurements for the traffic that may have been toggled. As discussed previously, the ranges of the toggled traffic may either be set manually by the user of the Visual UI 200 or may be set automatically using state-of-the-art machine learning algorithms.

For example, a user of the SaaS platform 100 may specify 10% of China traffic, 100% of iPhone traffic, 25% of 320×50 traffic, and the like. But, the overall traffic is controlled so that it does not exceed the max QPS value, which may be specified by the user or set automatically in the Max QPS field 220. In an example, a feature may be blacklisted by setting a toggle value of 0%. Thus, the overall system may allow buyers to specify the traffic characteristics at a very detailed level by providing a large number of configurations for the toggle parameters, including allowing single toggle parameters or combinations of toggle parameters.

The configurations of the toggle parameters may be managed in such a way that the Visual UI 200 provides complete control and transparency to all the sections of users, be it the plurality of DSPs 104 or the plurality of RTB ad exchanges 102. While each of the plurality of RTB ad exchanges 102 may be able to define inventory allocation rules and gain insights into DSP inventory needs along with utilization and fill rate, each of the plurality of DSPs 104 may be able to view available inventory and set rules for which traffic to let through from each supply source.

In an example, the Visual UI 200 may include a plurality of buttons such as a reset button 212 to reset all the set values, a save draft button 214 to save the updated toggle parameter values, and a publish button 218 to publish the set values of the toggle parameters to the routing component 108.

In an example, the Visual UI 200 may be able to provide immediate feedback to both the plurality of DSPs 104 as well the plurality of RTB ad exchanges 102 on available bid requests and bid rates exchanged between the plurality of DSPs 104 and the plurality of RTB ad exchanges 102. The traffic exchanged between the plurality of DSPs 104 and the plurality of RTB ad exchanges 102 may be toggled based on the configurations pushed from the Visual UI 200 to the routing component 108 of the SaaS platform 100. In an example, the traffic exchanged between the plurality of DSPs 104 and the plurality of RTB ad exchanges 102 may be toggled based on the below-mentioned algorithm, which is one of the various examples that can be implemented according to the various features and capabilities of the present disclosure:

k→DSP i→feature j→exchange

Q→QPS x∈{0,1}→boolean assignment variable 1 if $x_{ijk}=1$ if $$\alpha_{jk} = \frac{Q_k}{Q_j} \rightarrow$$

proportion of exchange j traffic that can be allocated to DSP k. This is to account for the relative size difference between the DSP and the exchange $$\beta_{jk} = \frac{Q_{jk}}{Q_k} \rightarrow$$

proportion of DSP k traffic allocated to exchange j, j $$\delta_{ijk} = \frac{Q_{ik}}{Q_{ij}} \rightarrow$$

proportion of feature I traffic allocated from exchange j $$\varepsilon_i = \frac{Q_{ik}}{Q_k} \rightarrow$$

proportion of feature i traffic allocated from in DSP kk $\alpha_{jk} \cdot \beta_{jk} \cdot \delta_{ijk} \cdot \varepsilon_i \approx p(x_{ijk}=1)$ p(U)→Uniform random number $p(U) \leq \alpha^{jk} \cdot \beta_{jk} \cdot \delta_{ijk} \cdot \varepsilon_i$ To allocate traffic, a random number may be generated and compared it to desired probability. If the generated value is less than or equal to the desired value, $x_{ijk}=1$. i.e.

if $(p(U) \leq \alpha_{jk} \cdot \beta_{jk} \cdot \delta_{ijk} \cdot \varepsilon_i)\{p(x_{ijk}=1)\}$ Approximation:

$$\text{if} \begin{pmatrix} p(U) \leq \alpha_{jk} \wedge \\ p(U) \leq \beta_{jk} \wedge \\ p(U) \leq \delta_{ijk} \wedge \\ p(U) \leq \varepsilon_i \end{pmatrix} \{p(x_{ijk}=1)\}$$

In an example, the Visual UI 200 may be configured to read in and write out the toggle settings and configuration to a database. Further, the Visual UI 200 may work in accordance with the toggle setting created using a traffic forecasting system, which sends out event logs about traffic to the Visual UI 200. The Visual UI 200 may then use this information to set the configurations of toggle parameters and then publish them out to the routing component 108.

In an example, the routing component 108 may update the configurations automatically according to real-time traffic conditions. For example, if a user-specified 1,000 transactions per second (based on 25% of the traffic), but that spiked at a point in time, it would be automatically adjusted to get the user back to that 1,000 transactions per second specification.

The SaaS platform 100 may enable performing optimizations on the traffic exchanged between the plurality of DSPs 104 and the plurality of RTB ad exchanges 102. The optimizations may be performed by the optimization module 118 of the SaaS platform 100.

Figure 3:
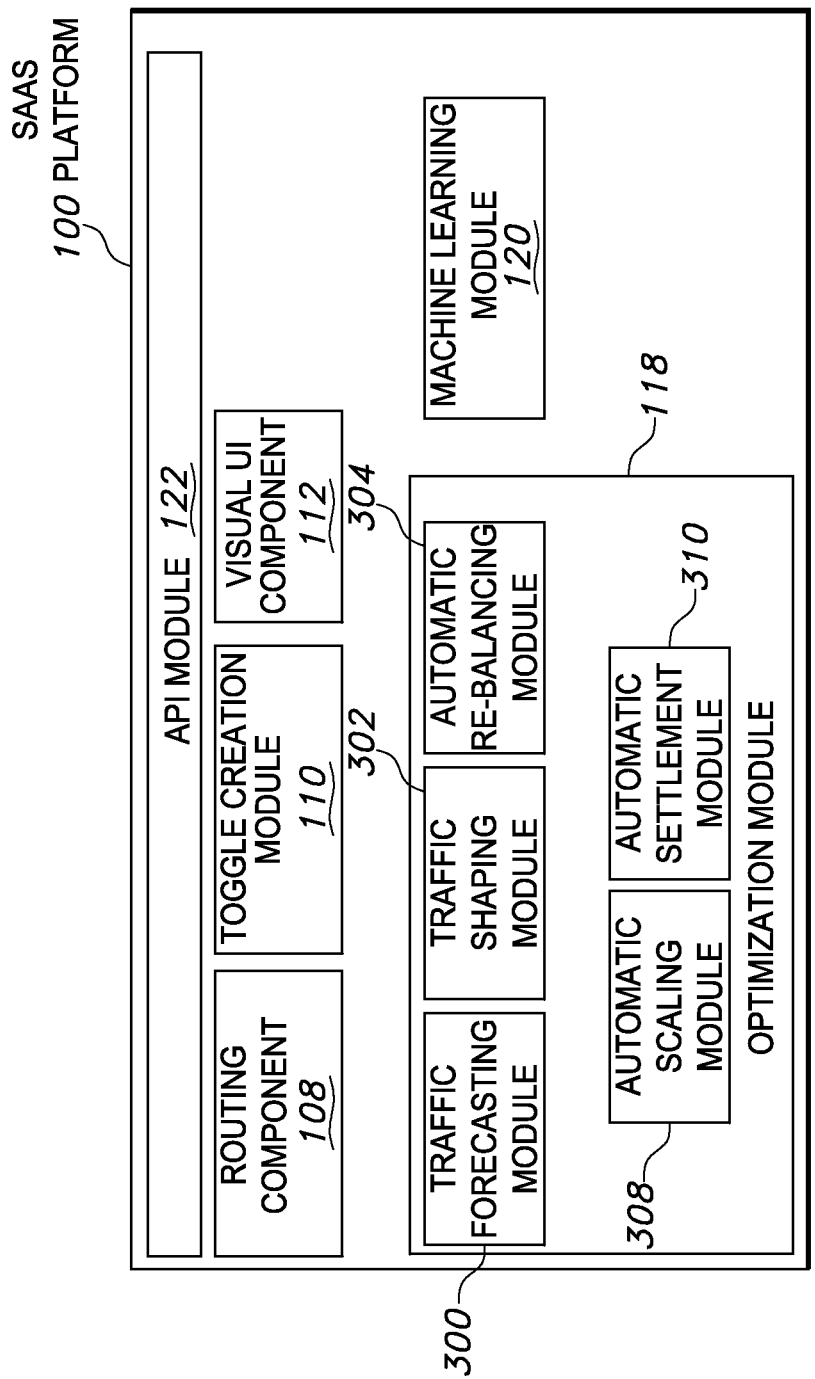
FIG. 3 illustrates an optimization module for the platform for programmatic advertising in accordance with an embodiment of the present disclosure.

FIG. 3 illustrates the optimization module 118 of the SaaS platform 100 in accordance with an embodiment of the disclosure. The optimization module 118 may include additional modules for performing a plurality of optimizations on the traffic exchanged between the plurality of DSPs 104 and the plurality of RTB ad exchanges 102. The additional modules may include a traffic forecasting system 300, a traffic shaping module 302, an automatic re-balancing module 304, an automated scaling module 308, and an automated settlement module 310 for settling transactions conducted between the plurality of DSPs 104 and the plurality of RTB ad exchanges 102.

The traffic forecasting module 300 may be configured to provide detailed forecasts for ad inventory data based on historical data about the ad inventory. The traffic forecast may include providing bid stream projections for different toggle parameters and for combinations of toggle parameters. The projections may be obtained based on calculations performed on valid available and/or toggled inventory and confidence interval for the forecast repeatability. The forecasts may be used to assist DSPs in managing an optimum amount of desirable traffic by the use of optimization module 118. This may further enable DSPs to be engaged only in managing that traffic which is likely to win auctions, thereby providing better efficiency.

In embodiments of the traffic forecasting module 300, information across different DSPs that use the platform descried herein may be used for forecasting wins algorithmically. In some cases, a request for the same impression may come from two different end points (e.g., one or more DSPs used by two different parties, each of which is connected to the platform described herein in order to optimize winning bids for each of them). The traffic forecasting module 300 may look at forecasted traffic across various RTBs over a given time period and, based on information about bids from the different parties, may allocate the bids over time and over RTB exchanges so that the probability is optimized that both (or multiple) parties that are competing for the same kinds of impressions are able to fulfill their desired traffic mix without wasting resources (such as, for example, using filters to avoid having a party bid repeatedly during a time period when it is highly unlikely that its bids will win, and then time-shifting the bidding during a time that is forecasted to have more winning bids). By forecasting winning bids on exchanges across different DSPs that are connected to the platform, the platform can provide information to each of them that suggests ways to toggle, filter and time their campaigns to achieve more winning bids and higher ROIs.

In embodiments, the forecasting module 300 may be used to forecast change an RTB advertising exchange is likely to make. In some cases, the changes may be predicted based on a forecasted influence of the traffic that the platform routes to the RTB ad exchange; that is, traffic patterns of the RTB ad exchange may be predicted based on information about what traffic will be routed, what bids will win, what prices will prevail, and the like using information across different DSPs and information across different exchanges. With these forecasts, it may be possible to determine desired changes in the behavior of the RTB ad exchange, such as a desire to reduce traffic in order to allow a higher percentage of winning bids for DSPs at a given time, etc., as well as to determine what changes in traffic between DSPs and the RTB exchanges would be forecast to result in the changed conditions. Because the methods and systems described herein can be used to influence inbound and outbound traffic among the DSPs and the RTB ad exchanges, a desired behavior of the RTB ad exchange may be influenced. First, various toggles and filters may be used for DSPs to influence the mix of bids being delivered, which may affect the exchange in predicted ways. Also, in embodiments, the platform may be used to influence the traffic coming from RTB ad exchanges to DSPs to further obtain a desired shape of traffic. For example, application programming interfaces (APIs) of an RTB ad exchange may be configured to shape the traffic provided to a DSP and/or to influence the automated systems of the RTB ad exchanges to pick up a desired amount of traffic from a DSP. These and other techniques for influencing the overall traffic shape may be used, based on forecasting, to influence desired RTB ad exchange behavior in order to provide better overall outcomes for DSPs (i.e., having a desired mix of winning bids that satisfy the attributes required for a campaign).

The optimization module 118 may further include the traffic shaping module 302 that may enable providing automatic shaping of bid request traffic and bid response traffic to satisfy a traffic specification.

In an example, the traffic shaping module 302 may be configured to provide an architecture for traffic shaping.

In an example, the traffic shaping module 302 may be configured to provide an algorithmic approach for traffic shaping.

In an example, traffic shaping may be performed on the basis of rate limiting and p-value. For traffic shaping, different toggle attributes may be constrained. For example, if for a handset (such as the iPhone) there is an available traffic of 100, and a DSP wants to get only 10 of those, then actually only 10% of the traffic is needed for that feature and attribute. This type of shaping may be repeated for every feature and every attribute of the overall traffic, resulting in highly tuned shaping. Another example of a different approach to shaping would be to always send 100% of any available traffic for a type of handset, such as the iPhone, even if the rate of queries per second (QPS) changes over the time. Accordingly, the desired shape of traffic based on various features and attributes can be highly tuned according to the methods and systems described throughout this disclosure.

The optimization module 118 may further include the automatic re-balancing module 304, which may enable providing automatic re-balancing of bid request traffic and bid response traffic to satisfy a traffic specification based on experience with respect to actual traffic.

In an example, the automatic re-balancing may be performed on the basis of specific metrics that may be taken as input. For example, in one scenario automatic re-balancing may be performed on the basis of click through rate. In another example, re-balancing may be performed on the basis of a weighting of inputs. For weighting, a ranking based model may be used to allocate priorities to different metrics.

Some examples of the steps that may need to be performed before performing automatic re-balancing may include data preparation, including without limitation, request parsing, feature list generation, response parser generation, routing table generation, configuration parser creation for both exchanges and DSPs, offline processing including routing table generation, bitmap generation, bitmap collapsing and matching, online processing including request parsing, matching features to bitmap, and countdown new allocation from upper bound, and the like.

In embodiments, various forms of an algorithm may be developed and applied in the platform described throughout this disclosure, to arrive at solutions to various problems or to accomplish various objectives, such as ones defined by using the following or similar variables, parameters and problem statements:

$x \in \{0,1\} \rightarrow$ Assignment variable
$e \in \{1 \ldots E\} \rightarrow$ Exchange
$d \in \{1 \ldots D\} \rightarrow$ DSP
$a \in \{1 \ldots A\} \rightarrow$ Attributes
$f \in \{1 \ldots F\} \rightarrow$ Features
$r \rightarrow$ Request
$l_r \rightarrow$ Floor passed on the request r
$\theta \rightarrow$ Exploration Bounds
$\psi \in [0 \ldots 1] \rightarrow$ CPM floor exploration bounds explored by nT and set by exchange
$\vec{t} \rightarrow$ Time since the last bid
$\zeta \rightarrow$ Upper bound on time since last bid
$\tau \rightarrow$ Average clearing price
$\sigma \rightarrow$ Standard deviation
$\mu \rightarrow$ Frequency cap
$\eta \rightarrow$ Session depth
$\gamma \rightarrow$ DSP Exploration
$\beta \rightarrow$ Exchange exploration Objectives may include an Exchange objective—$\text{Max}\Sigma_d B_{d|f}$; a DSP objective $\text{Max}\Sigma_d x_{d|f}$; an NT routing table generation objective—$\text{Max}\Sigma_{d[k]} x_{d|f} E[B_{d|f}]$ such as for generation of a list of K DSPs to send the requests; and an NT Bid response objective—Max (p(win))+Max(p(win))Min (response Payload).

In an example, a particular problem or objective may be defined, such as forecasting the inventory for the next time period. A variable may define the count of the number of attributes. Further, for each DSP 104 the valid matches may be generated for each attribute and exchange combination. Further, matching of the features of each attribute may be done and all exclusions may be excluded in the configurations $\Sigma ex_{edf} \leq \varphi . D_{edf} \forall d$. For each eligible attribute the DSPs may generate the upper bound on the number of requests to be passed. These are the countdown values. As each request matches the routing criteria, the corresponding number is subtracted.

Further, an interval may be within which the traffic counts may be provided $\Sigma_d \Sigma_e x_{edf} \geq \varphi . D_{edf} - \epsilon, \forall d \Sigma_d \Sigma_e x_{edf} \leq \varphi . D_{edf} + \epsilon, \forall d$.

Further, the algorithm may be constrained, such as with rules such as: Do not assign more traffic than exists, $\Sigma_d x_{edf} \leq E_{ef} \forall e$.

However, the algorithm may need to accommodate the expected bid to be above the CPM floor $x_{d|f} B_{d|f} \geq l_r . \psi, \forall r$.

The assignments may stop when the time since the last bid for the feature set is greater than the threshold, $x_{d|f} \cdot \vec{t} \leq \zeta, \forall edf$.

Feature/user level frequency caps can be set with a lower and an upper bound, $\Sigma_d \Sigma_e x_{edf} + \mu_0 \leq \overline{\mu_{ed}}, \forall edf$.

Bids may continue to be sent based on the distribution of the clearing price using the mean clearing price within a standard deviation, $x_{d|f} B_{d|f} \geq \tau - \sigma, \forall edf$. If a session depth constraint exists, assignment may be performed with lower and upper bounds on session depth, $x_{d|f} + \eta \leq \overline{\eta}, \forall edf$.

For a request in, if the routing table has a 1 for a given exchange, DSP and feature set combination, the request may be assigned, $\gamma \Sigma_e x_{edf} \leq D_d \forall_d$. In some cases, exploration may be omitted.

The following is to ensure that DSP and Exchange exploration constraints are maintained, $(1-\gamma)\Sigma_e x_{edf} \leq (1-\beta) D_d \forall d$.

For a response out, a response from a DSP is returned if the bid is above the CPM floor $$y = \begin{cases} 1 \rightarrow \text{if } (B_{edf} \geq l_r . \psi) \\ 0 \rightarrow \text{otherwise} \end{cases}$$

The number of DSP responses should be above a minimum and below a maximum number of responses returned, $\Sigma_j y_{edf} \geq k_0 \forall r, \Sigma_j y_{edf} \leq k \forall r$.

In an example, rebalancing may be performed on the basis of estimated QPS value provided in the Visual UI 200. In one example among various possibilities, the rebalancing may be performed at the attribute and or feature level.

The disclosure defines a methodology for a given DSP 104 for a given exchange. There may be a higher level rebalancing method to ensure that the QPS constraints are not violated across exchanges. So, in the following method, j and k are eliminated from the formulas.

R→Request QPS
F→Filtered QPS
Q→max QPS allowed
k→DSP
i→Feature/attribute depending on the level
i→Feature for which, the desired proportion is changed from default
j→Exchange
$p_{ijk} \rightarrow p(x_{ijk}=1)$
$p_i \rightarrow$ proportion of traffic to be allocated for feature i $$R_i \geq F_i$$

$$p_i = \frac{F_i}{R_i}$$

$$F_i = p_i . R_i$$

To rebalance there may be two considerations in hierarchy level rebalancing and below hierarchy level rebalancing of constraints.

To rebalance all levels below the current hierarchy $$\sum_i F_i = p_i . \sum_i R_i$$

When the desired QPS for a feature or attribute is changed the resulting change in QPS capacity may need to be readjusted to all the other features and/or attributes in the same hierarchy level.

$$\sum_{i''} R_{i''} = \sum_i R_i - \sum_{i'} R_{i'}$$

$$\sum_{i''} F_{i''} = \sum_i F_i - \sum_{i'} F_{i'}$$

$$p_{i''} = \frac{\sum_{i''} F_{i''}}{\sum_{i''} R_{i''}}$$

$$F_{i''} = p_{i''} . R_{i''}, \forall i$$

In an example, the levels of hierarchy in the order top to bottom may be defined as OS→country→carrier/Wi-Fi→ad format→placement→handset. User list is independent and has $p(x_{ijk}=1)$ for any request where the user id matches.

Bid data may come through the routing component 108 of the SaaS platform 100. All the other data may come from elsewhere.

There are certain things that the users of the SaaS platform 100 may need to know. For example, for the click-through-rate (CTR) parameter, the user may want to be aware of the clicks and where those clicks came from, such as from which website, app, country, and handset. This may provide information about which one of these helped in getting the clicks and raising CTRs. They may be classified into two sets: click and no click, which come from a set of requests. There may be some requests that may always generate in a click, some that may never generate a click, and some that may have some probability associated with it. Once this information is available a multi-variate overlap analysis may be performed that may overlap all the features. For example, a user of iPhone may get a lot of the clicks, then the user may want to analyze if this is the handset that the user was targeting. Another approach may be to cluster the apps, the handsets, and other parameters together and to find the density of each of them.

In another example, the analysis may be done at the user level as well. For example, analyzing who are the types of users, creating clusters of users, analyzing the clicks to determine which cluster the click is coming from, and identifying the strength of the behavior and then determining whether the bid request should be sent towards the particular DSP.

In an example, the information related to the clicks may be gathered using click-wrap or firing a pixel. In another example, an API may be used to post this information in real-time.

In an example, the CTR may be influenced by using location and proximity to a store. In the custom list, the user may upload GPS locations and that location may be matched to a tile.

In an example, all the parameters discussed above may alter the p values disclosed in the traffic rebalancing algorithms of the optimization module 118.

The optimization module 118 may further include the automatic scaling module 308 that may enable providing automated scaling of the number of computing resources used in a cloud to facilitate automated shaping and rebalancing of the bid request and bid response traffic to satisfy a user's desired traffic specification.

Generally, a DSP 104 may provision a fleet of virtual machines (for example, boxes on Amazon cloud) that may handle traffic coming from the various RTB ad exchanges 102 (such as Google, Rubicon, Mopub, and the like). They look at a console (such as in AWS or Softlayer) and turn them on and off. When more exchanges are added, more boxes may be added by the DSPs.

However, using the automatic scaling module 308 may provide the DSPs 104 with the capabilities to provision the correct amount of cloud instances based on exact traffic. The automatic scaling module 308 may be configured to dynamically adjust the boxes, based on the amount of traffic the router determined, and also using manual intervention. In an example, the boxes may be spun up and down very quickly based on the router controlling the traffic flow.

The optimization module 118 may further include the automatic settlement module 310 that may enable providing automated settlement of transactions between the plurality of DSPs 104 and the plurality of RTB ad exchanges 102.

In an example, the automatic settlement module 310 may provide a neutral third party to clear transactions between the DSPs 104 and the RTB ad exchanges 102. The event data related to auctions may pass through the core engine including impressions, clicks, and conversions. This data may then be easily surfaced in dashboards to highlight discrepancy rates and make resolution by a neutral third-party possible. In an example, the automatic settlement module 310 may further aid DSPs 104 and RTB ad exchanges 102 to detect, diagnose and resolve discrepancies.

In an example, the automatic settlement module 310 may certify and provide deep transaction data.

In an example, the automatic settlement module 310 may verify advertisement views using settlement tickets.

In an example, the automatic settlement module 310 may record level details to enable discrepancy resolution.

In an example, the automatic settlement module 310 may provide a dashboard to provide cross-exchange visibility.

In an example, the automatic settlement module 310 may provide a settlement suite and dashboard.

The optimizations provided by the optimization module 118 may enable more efficient and quicker routing of traffic between the plurality of DSPs 104 and the plurality of RTB ad exchanges 102. The optimization module 118 may take data indicating what advertising traffic is actually being obtained through the platform 120 (e.g., in terms of what advertisements are displayed in what applications, in what websites, on what types of handsets, and the like) and use that data, as well as any third party data on outcomes, to provide feedback, which can be used to further optimize the toggles and filters described herein. In embodiments, the optimization module 118 may interact with the machine learning module 120 of the SaaS platform 100 for executing a plurality of algorithms for achieving traffic optimizations, such as the traffic forecasting algorithm, the traffic shaping algorithm, an adaptive back-pressure algorithm, and the like. The machine learning module 120 may allow a user to tune the platform 100 based on whatever a user's objective may be; for example, a user may wish to maximize click-through rates (CTR), in which case maximizing the CTR may be fed to the machine learning module 120 as an objective, such that the machine learning module 120 tunes various toggles and filters over time to deliver a mix of traffic to improve CTR. In embodiments, the platform 100 may include a rate limiter, such as to avoid providing a DSP 104 with more traffic than it can handle (e.g., 100 QPS). The rate limiter may apply, for example, to any one-second period. In embodiments, the rate limiter may also smooth the amount of traffic that a DSP 104 is sent during the sub-periods within a one-second period.

In an example, the execution of the algorithms may result in improved performance of the overall traffic flow between the DSPs 104 and the RTB ad exchanges 102 that may be presented graphically to the users. For example, the outputs of the traffic forecasting module 300 may be presented visually to the user, as illustrated in FIG. 4.

Figure 4:
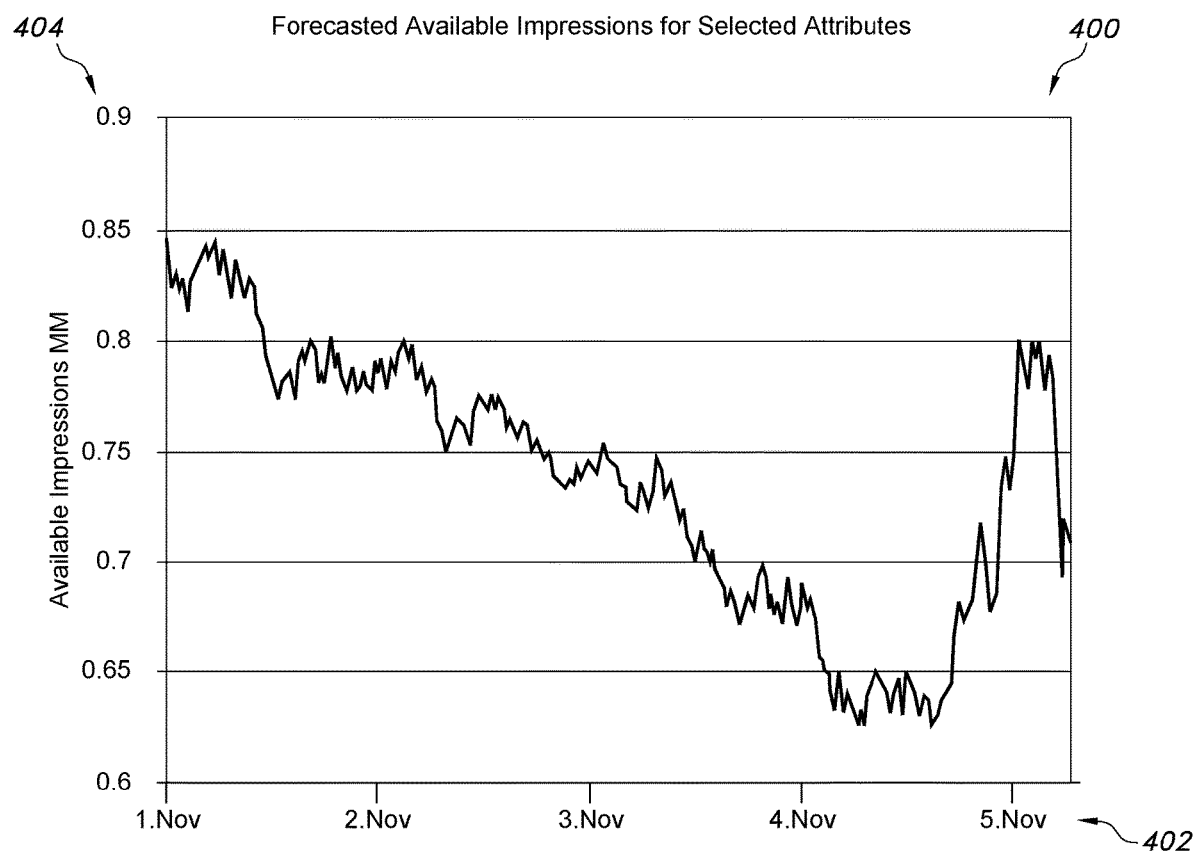
FIG. 4 illustrates a machine learning module for the platform for programmatic advertising in accordance with an embodiment of the present disclosure.

FIG. 4 illustrates an exemplary embodiment of the visual interface of the traffic forecasting module 300 of the SaaS platform 100.

The visual interface 400 may provide a visual representation for the traffic forecasts generated by the traffic forecasting system. The visual representation may depict the expected traffic volumes during a selected time period. For example, the visual interface depicted in FIG. 4 illustrates the traffic forecasts over a period of five days, represented on the X-axis that is the time axis 402. The traffic volumes are depicted on the Y-axis, the traffic axis 404. The traffic volume may be represented in the form of available impressions. In an example, the forecasts may be automatically generated by the SaaS platform 100 using the machine learning module 120.

Figure 5:
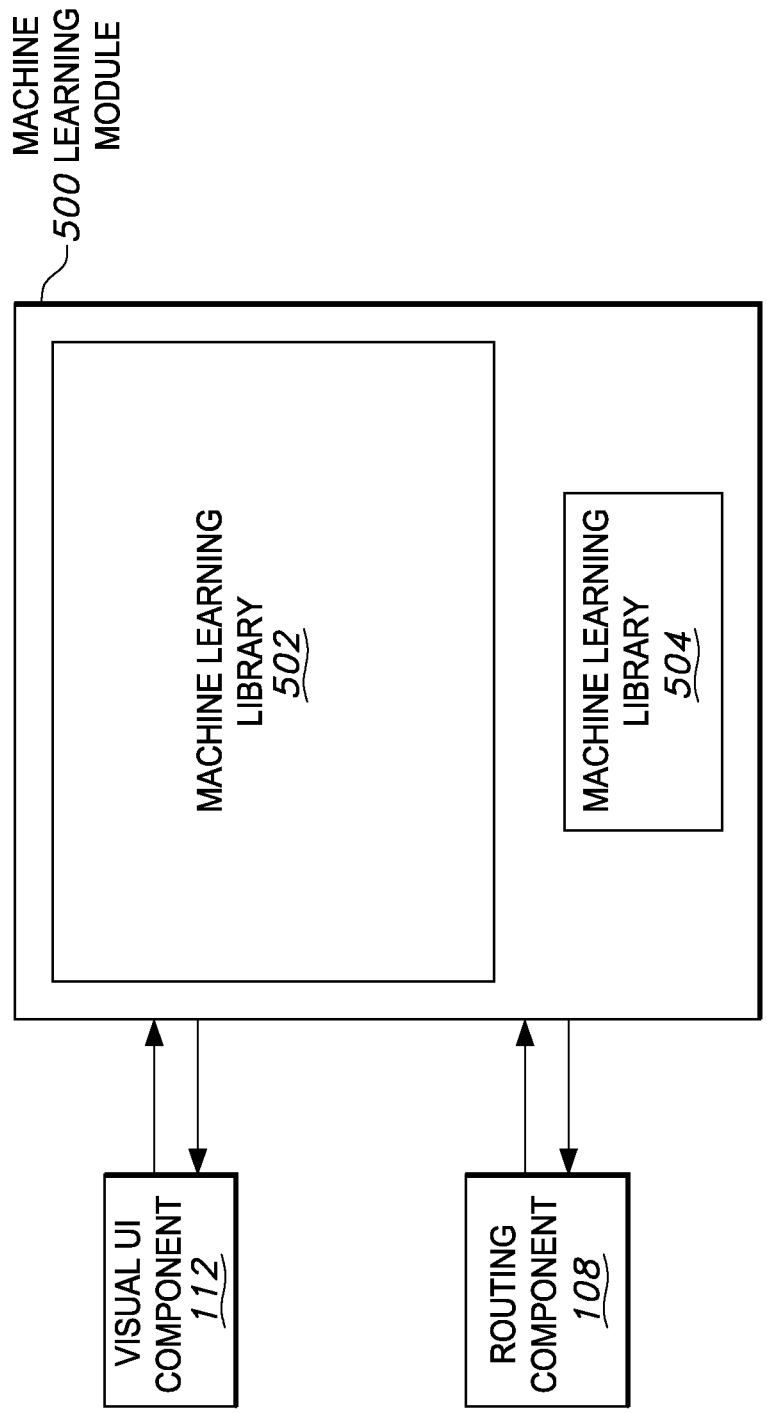
FIG. 5 illustrates an exemplary embodiment of the visual interface for the platform for programmatic advertising in accordance with an embodiment of the present disclosure.

FIG. 5 illustrates a machine learning module 500 of the SaaS platform 100. The machine learning module 500 illustrates the detailed components of the machine learning module 120 of FIG. 1. The machine learning module 500 may include a machine learning library 502 and a data storage module 504.

The machine learning library 502 may include a plurality of high-level machine learning algorithms and utilities, and the data storage module 504 may be configured to store data required for performing algorithmic computations. The algorithms specified in the machine learning library 502 may be configured to support traffic forecasting, traffic smoothing, manual bid request routing, automated bid request routing and other similar functions. The machine learning module 500 may be accessed using high-level API calls for machine learning (ML) resources. The algorithms specified in the machine learning library 502 may be accessed using API calls from different components of the SaaS platform 100. For example, the visual UI component 112 may access the machine learning module 500 using API calls that may include data of a toggle parameter. The machine learning module 500 may use this data as input parameter value for a traffic shaping algorithm stored in the machine learning library 502. The algorithm may then be used to direct the routing component 108 to shape the traffic between the plurality of DSPs 104 and the plurality of RTB ad exchanges 102 based on the toggle parameter values used in the algorithm.

In an example, the machine learning library 502 may include an algorithm for traffic shaping based on bidding parameter.

In an example, the machine learning library 502 may include an algorithm for traffic shaping based on win rate parameter.

In an example, the machine learning library 502 may include an algorithm for traffic shaping based on ad impression parameter.

In an example, the machine learning library 502 may include an algorithm for traffic shaping based on click-through rate (CTR) parameter.

In an example, the machine learning library 502 may include an algorithm for traffic shaping based on conversion rate (CVR) parameter.

In an example, the machine learning library 502 may include an algorithm for traffic forecasting, as discussed previously in the disclosure.

In an example, forecasting may be performed on the basis of a massive search engine. The massive search engine may work like a router. For example, for a particular handset type, such as the iPhone, a probability value may be defined. For example, it may be defined that iPhone has a probability of 10%. Then a random number may be generated. Further, it may be determined if the random number is less than or equal to p for each of the features that is coming through the system. For iPhone, a table may be stored in memory that has all the p values and all the features. If the feature is iPhone and the feature p-value is 10%, then using an extremely fast way of doing bitwise operations, a request may be picked up. In a few microseconds, the random number may be checked and it may be determined whether a feature can come through or not. If the feature came through, the request can be picked up.

In an example, forecasting may be done by building it into a massive network. For example, if a set of four features desired for targeting in a mobile advertising campaign are taken (such as operator network being a United States network, the handset operating system type, the application being a designated application, and the location being in the Eastern United States), it may be observed that each of these variables is interdependent with the others in determining what amount of placement occurs in an RTB campaign. For example, if traffic is reduced by filtering to a certain handset operating system (for example, IOS 7.1.2), the traffic to which each other filter will be applied is impacted. If a user wants only 10% of bid requests to go to IOS v7.1.2 devices, then, for example, out of 100 bid requests that otherwise might have gone to such devices, the remaining 90 need to be allocated over other types of devices. As traffic gets reduced or increased by each of the filters along each of the degrees by which filtering is allowed, the traffic presented to other filters is modified. Thus, any change in one parameter changes the number of bid requests that come through the others. This set of interdependent parameters may be optimized through various optimization techniques, including machine learning techniques, iteration-based approaches, analytic approaches, and the like.

In an example, the machine learning library 502 may include an algorithm for predictive analysis. The predictive analysis may be based on the likelihood of a bid request to win an auction as a key driver. This may enable the routing component 108 to route only that traffic to the users of the plurality of DSPs 104 that may enable them to win the auctions and avoid consuming the capacity of the DSPs 104 with undue bid requests that may be unlikely to win due to competition, floor pricing, and low demand.

In an example, the algorithms for traffic shaping included in the machine learning library 502 may be governed by the max (QPS) parameter of the visual UI 200 discussed previously in the disclosure.

The machine learning module 500 may be configured to interact with the visual UI component 112 and the routing component 108 to adjust routing of traffic between the plurality of DSPs 104 and the plurality of RTB ad exchanges 102. In an example, the machine learning module 500 may enable routing of traffic from the routing component 108, based on the feedback associated with one of the toggle parameters in the plurality of toggle parameters specified in the visual UI component 112. The routing of traffic may be enabled using one or more of the plurality of algorithms defined in the machine learning library 502 of the machine learning module 500. The routing component 108 of the SaaS platform 100 utilizes the high-level algorithms stored in the machine learning library 502 to provide efficient routing of traffic towards the DSPs 104 in a simplified manner. The features of the SaaS platform 100 and the routing component 108 may be accessed using a set of high-level APIs. In this way, the routing component 108 acts as a lightweight appliance having a single unified view for a plurality of DSPs 104 and a plurality of RTB ad exchanges 102.

Figure 6:
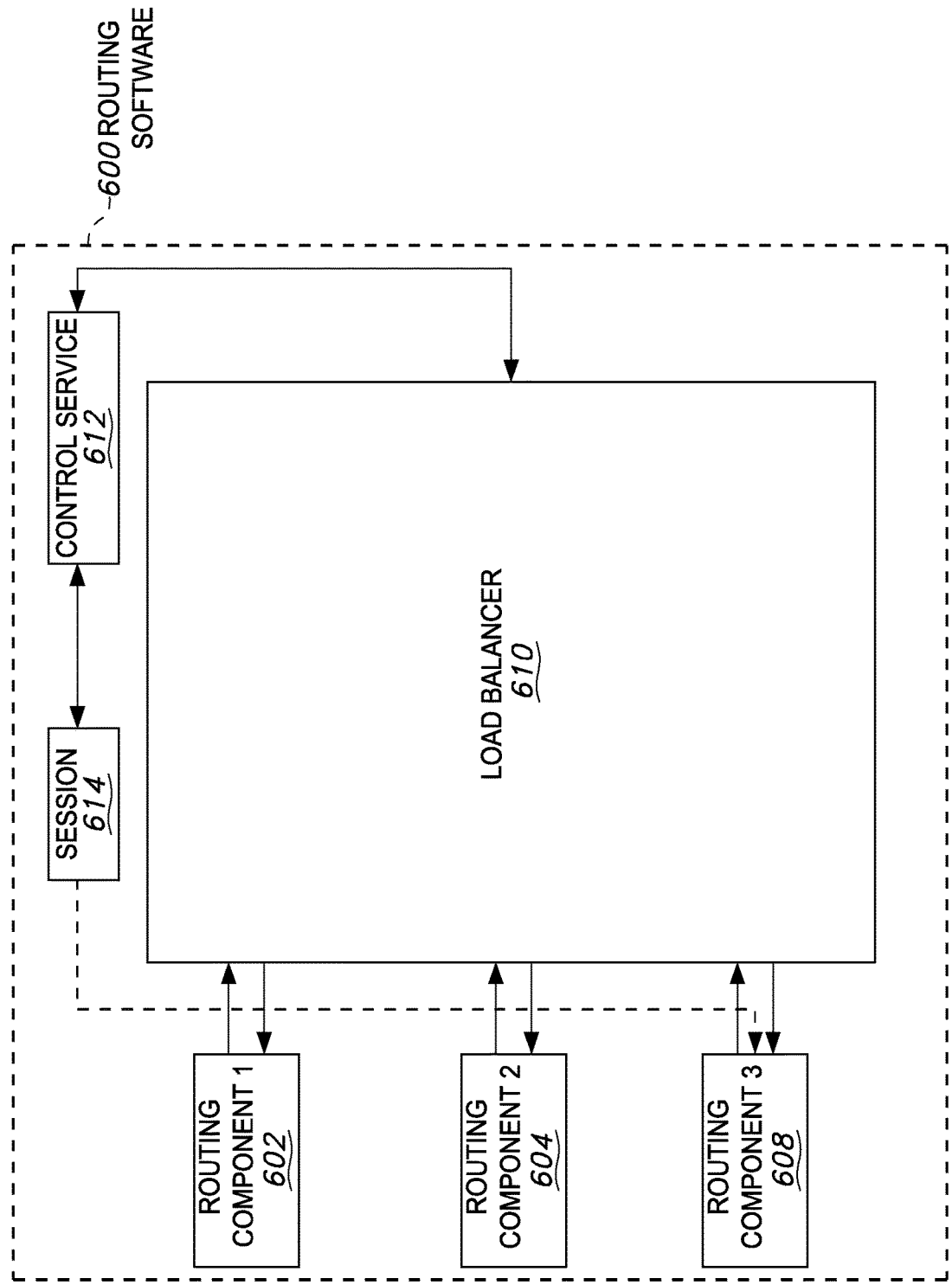
FIG. 6 illustrates an exemplary implementation of a routing component for the platform for programmatic advertising in accordance with an embodiment of the present disclosure.

FIG. 6 illustrates an exemplary implementation of a routing component of a SaaS platform, as lightweight routing software 600.

FIG. 6 illustrates connecting a plurality of instances of the routing component, as component 1 602, component 2 604, and component 3 608, such as implemented for different DSPs 104 and accessed using the APIs. The different instances of the routing components in FIG. 6 may access a load balancer 610, during a session 614 to access a main control service 612 of the routing software 600.

Through the use of APIs, the routing software 600 may be configured to present different DSPs 104 with a unified supply view and likewise, a unified demand view to different exchanges. Through a single integration, both sides may be able to control inventory flow with a normalized view of attributes and API calls.

The routing software 600 may, in embodiments, be deployed as a lightweight, low latency, software appliance, supporting distributed high-volume transactional systems. The routing software 600 may be configured to manage toggled inventory in a similar manner as the HTTP load balancer. Multiple routing component instances 602-604 may be linked together creating a high-speed low latency "switching network". This allows the routing software 600 to be co-located in a customer's data center, connected via fiber cross connects. The closer the routing software 600 is to supply and demand, network latency becomes less of a bottleneck. The routing software 600 may be configured to have a scalable design and efficient coding and low-level JVM (Java Virtual Machine) calls employing design patterns used in high-frequency financial trading systems. In embodiments, to maintain high throughput and a favorable network topology for routing, fiber cross connects may be employed, directly interfacing with the routing software 600, such as using TCP "anycast" protocols, thereby avoiding additional network hops. This approach provides a horizontally scalable network architecture, built on the anycast technology. Among other things, this allows horizontal scaling in an architecture free of load balancing. In embodiments, the routing software 600 may be located in a data center (such as co-located in a customer's data center) and connected via the fiber cross connects.

The routing software 600 may have the control service 612 that may perform all the functions defined by high-level algorithms discussed previously. The control service 612 may be accessed during the session 614 through the load balancing service 610, by the different instances of the routing component, 602-604, such as using API calls.

Multiple instances of the routing software 600 may be linked to each other in an exemplary architecture.

Figure 7:
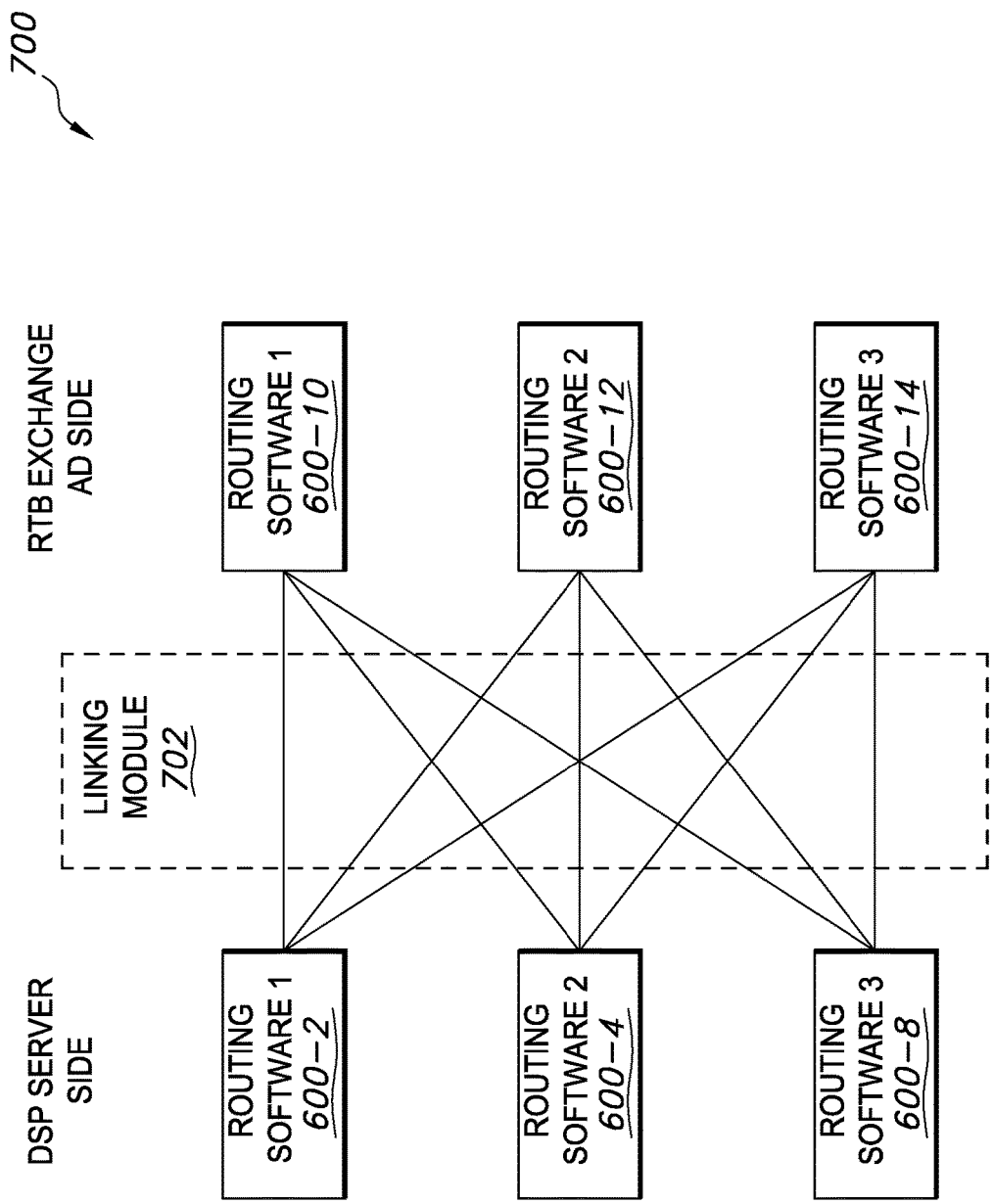
FIG. 7 illustrates an exemplary architecture showing connections between the multiple instances of the routing component for the platform for programmatic advertising in accordance with an embodiment of the present disclosure.

FIG. 7 illustrates an exemplary architecture showing connections between the multiple instances of the routing software 600.

The architecture 700 of FIG. 7 illustrates the different instances of the routing software 600, such as the routing software 600-2 through 600-8 on the DSP side, connected to a plurality of instances of the routing software 600, 600-10 through 600-14, on the RTB ad exchange side, through a linking module 702.

In an example, the linking module 702 may be implemented by the SaaS platform 100 and may act as a router for routing requests between different instances of the routing software on the DSP side and the exchange side. The linking module 702 may also be configured to enable fast routing of data between the DSPs 104 and the plurality of RTB ad exchanges 102 during a session.

In embodiments, a combination router may provide routing that accounts for interactions among the attributes that are used to initially route traffic, such as to account for cross-talk or other effects among attributes that may result in routing some undesirable traffic. While rule-based routing allows configuration of a somewhat limited number of different combinations of attributes, by using machine learning and automating routing, millions of combinations may be tried on the fly by machine learning in order to determine what routing combinations work best under the current conditions of a set of advertising networks. Thus, potentially millions (or more) combinations or attributes and toggles can be tried, and a combination router can automatically perform routing matches against each of the combinations of attributes proposed by machine learning on different attribute combinations, resulting in combinations that improve outcomes (e.g., ROI-based outcomes, numbers of winning bids, etc.) by automatically finding solutions that minimize potentially undesirable cross-talk that is hard to predict or manage with manual selection or toggling of attributes.

In an example, the linking module 702 may be implemented by the SaaS platform 100 during a request flow through the SaaS platform 100.

Figure 8:
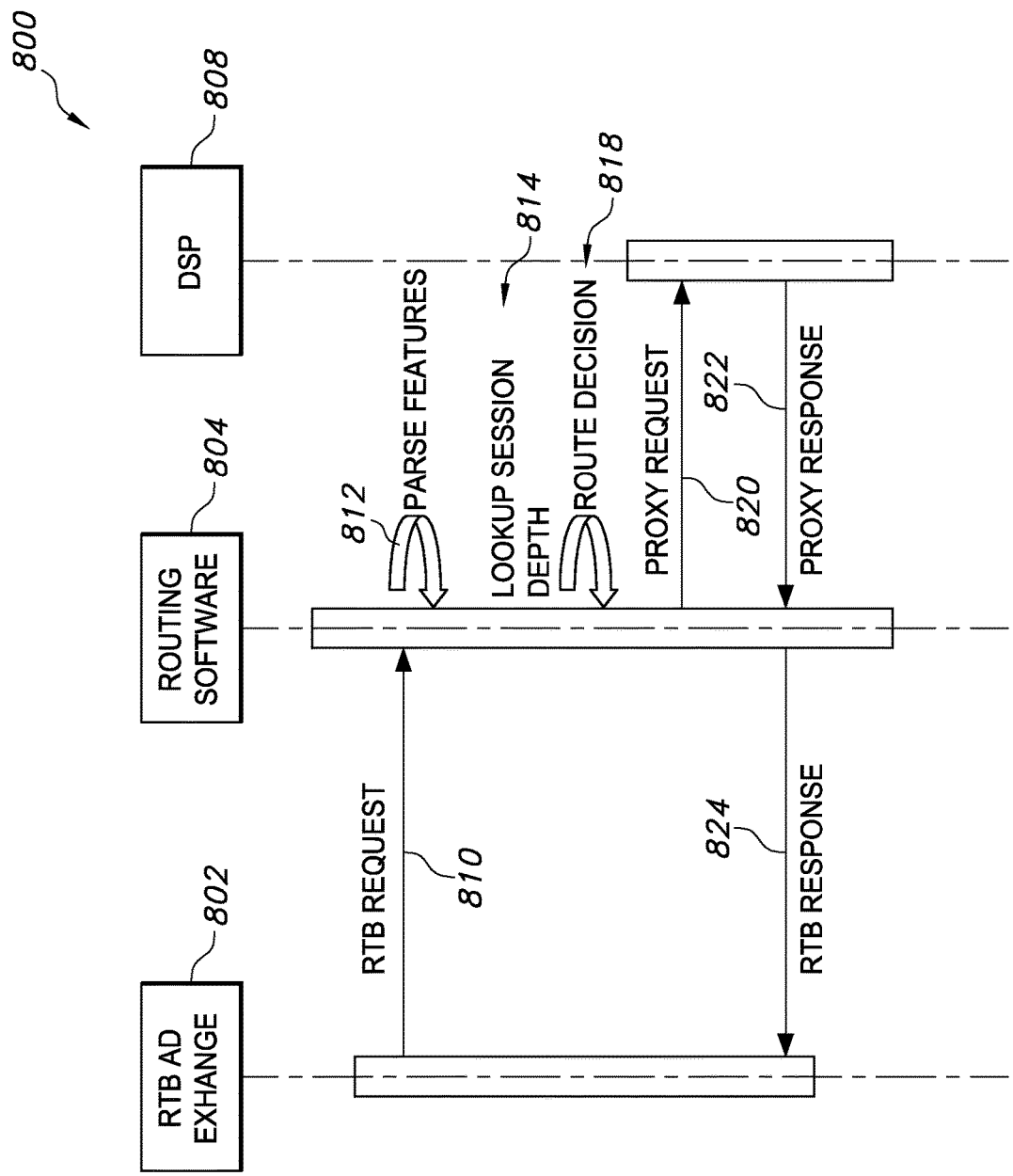
FIG. 8 illustrates a sequence diagram illustrating a typical request handled by the platform for programmatic advertising in accordance with an embodiment of the present disclosure.

FIG. 8 illustrates a sequence diagram 800 illustrating a typical request handled by the SaaS platform 100.

The bid request originates from the RTB ad exchange 802, passes through the routing component 804 at the SaaS platform 100, where a decision for routing is taken based on the toggle settings, and finally a bid response is sent from the DSP 808. The FIG. 8 illustrates an exemplary sequential flow of steps for this scenario.

The FIG. 8 illustrates that at 810, the bid request enters the system from the RTB ad exchange 802. At 812, the routing component 804 parses the features of the request. In an example, the features may correspond to the toggle settings and configurations set in the SaaS platform 100. Then, at 814, the routing component 804 looks up the session depth, and at 818, makes a route decision based on the toggle settings and the algorithms available in the SaaS platform 100 discussed previously. Then, at 820, the request passes through to the DSP 808 if the toggle settings match the bid request features and desired transaction levels (such as the max QPS levels discussed previously). Finally at 822, a bid response is sent from the DSP 808 to the routing component 804, which, at 824 forwards the bid response to the RTB ad exchange 802.

In an example, if at 820, the toggle settings do no match the request features, then a no bid response is sent from the DSP 808.

When a bid request enters the system, the routing component 108 of the SaaS platform 100 parses the features, looks up session depth and makes a route decision based on algorithms. These may include algorithms that account for session depth across different RTB exchanges, frequency capping algorithms, and the like. In embodiments, a request passes through to the DSP for bidding if toggles match the bid request features and desired transaction levels. A no bid response follows inventory that does not match toggles from DSPs leveraging the routing component 108 of the SaaS platform 100.

The steps described in the sequence diagram 800 are for exemplary purpose only. In an example, the sequence diagram 800 may include fewer or additional steps according to some other embodiments of the SaaS platform 100.

FIG. 9 illustrates a screen shot depicting a settlement report 900 that provides information about transactions that are executed using the platform for programmatic advertising in accordance with an embodiment of the present disclosure. Overall traffic may be presented visually, such as in a frame 902, such as by a bar or line that rises and falls with traffic levels at different time periods. A user may select, such as in a menu 904, which types of transactions should be included in the report, such as transactions for advertising on particular types of devices (e.g., iOS devices) or advertising in applications. A table 908 may provide transaction detail for settled transactions, such as indicating the date of the transaction, the publisher, the placement (i.e., the site or application in which the advertisement was displayed), an identifier for the content that was displayed, and one or more metrics or indicators relating to the display (e.g., whether it was viewed, a count as to the number of times it was displayed or viewed, or the like).

FIG. 10 illustrates an example of a report 1000 on filtered and available traffic for various types of device for programmatic advertising transactions in accordance with an embodiment of the present disclosure. A wide variety of such reports can be provided by the platform 100, indicating various outcomes in the programmatic advertising platform 100 of applying the toggles and other features described throughout this disclosure.

In an example, the SaaS platform 100 may support additional features such as a billing flow engine, internationalization of the Visual UI 200, enhanced toggle feature set, additional algorithms, and the like, that may be considered enhanced variations of the features disclosed by a person of ordinary skill in the art.

Figure 11:
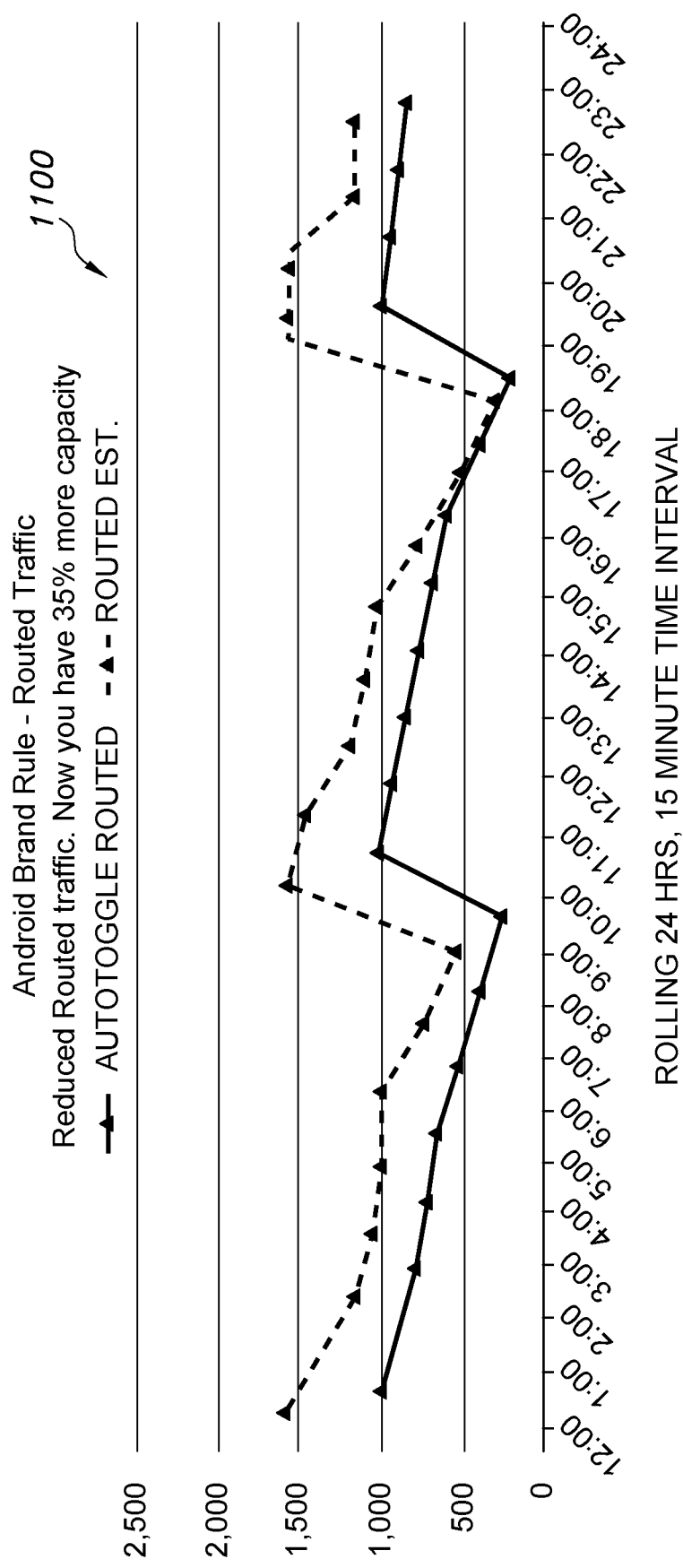
FIG. 11, FIG. 12, and FIG. 13 illustrate charts of toggled and estimated data traffic, bids, and bid rates based on the use of the data routing methods and systems described and depicted herein.
Figure 12:
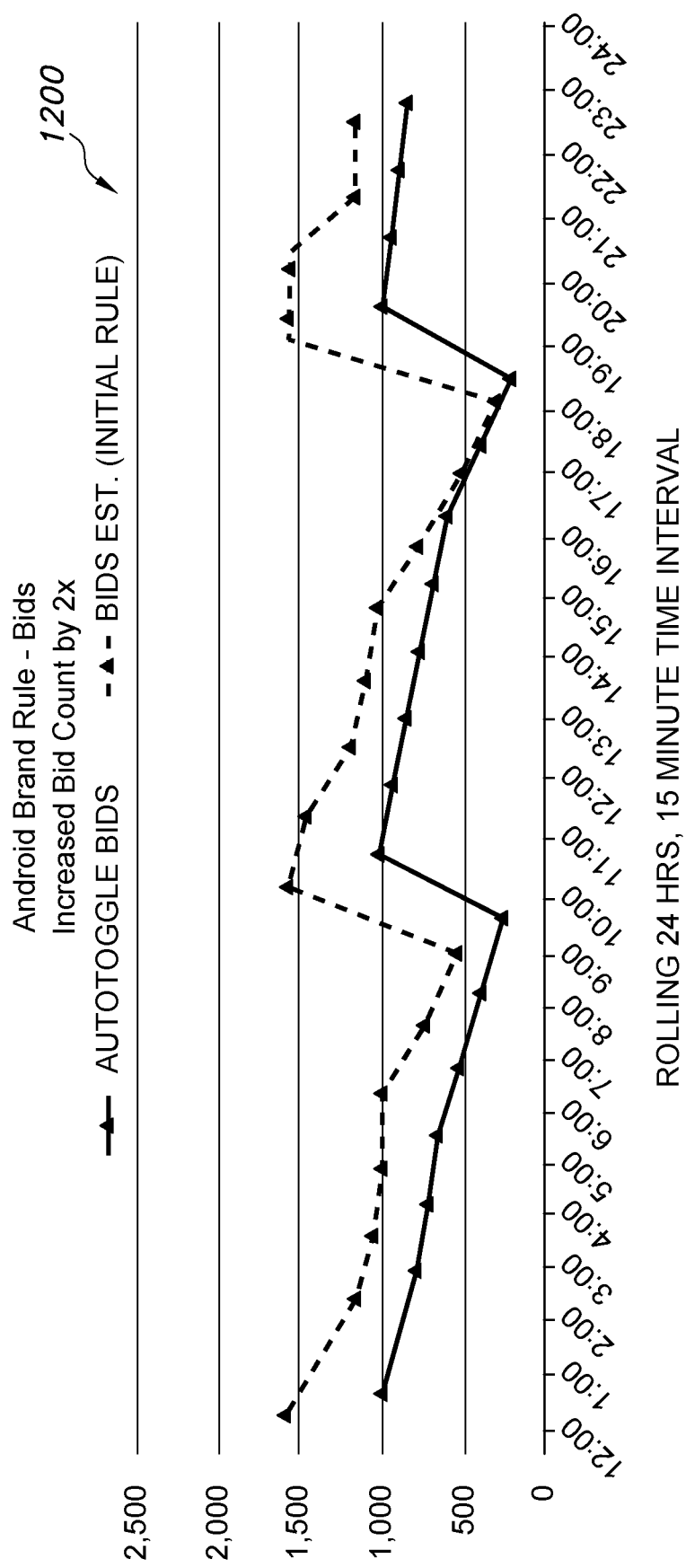
Figure 13:
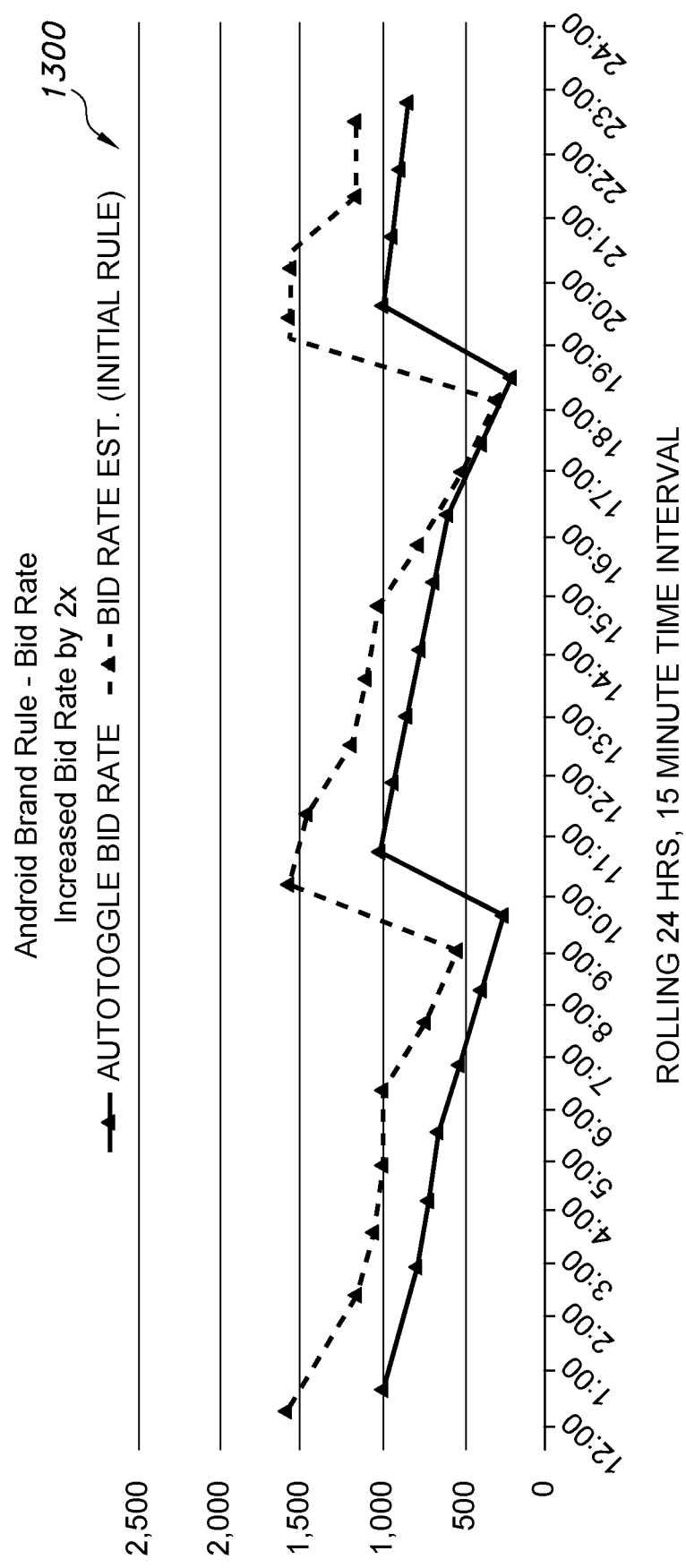

FIG. 11, FIG. 12, and FIG. 13 show examples of reports that can be generated in the user interface of the platform 100, demonstrating the impact of selecting a given rule and/or the impact of using a particular toggle or set of toggles. In embodiments, one or more of the algorithms described herein, or similar algorithms that optimize a set of toggles in view of a set of constraints under current bid/response traffic conditions, may be implemented automatically in the platform 100, resulting in a set of automatic toggles, or auto toggles. FIG. 11 shows a user interface screen 1100 that can be used to display to a user of the platform 100 the impact of using a given set of auto toggles to route traffic in an embodiment where a particular rule is in place that targets advertising to devices that use the Android brand platform. In the exemplary situation of FIG. 11, routing using auto toggles allowed a 35% reduction in routed traffic, relative to an estimate of the traffic that would have occurred otherwise. FIG. 12 shows a user interface screen 1200 and FIG. 13 shows a user interface screen 1300 in the exemplary situations of optimizing the toggles with a particular rule in place for targeting to the Android brand platform.

In embodiments the platform, by tracking attributes of traffic, bids, winning bids, and the like, may be used to detect anomalies, such as anomalies reflecting changing or unusual conditions of an RTB ad exchange. This may occur algorithmically, such as based on comparison of one or more of the attributes that are used for routing, forecasting, or the like to historical data for the RTB ad exchange. This can include, for example, the ability to allow a user of a DSP to obtain insight as to reasons why a mix of traffic may not be consistent with experience, such as explaining why fewer bids may be winning on a given exchange. While a user might think there is a need to change its behavior, anomaly detection might indicate that there was an exogenous, one-time change in the ad exchange (e.g., that it was offline for operational issues for a period of time, resulting in no winning bids for a DSP user, because there were none for any user) that is likely to revert to "normal" behavior, so that no changes are actually needed in the routing of traffic in order to have the DSP user's results to return to normal over the coming time period. By detecting anomalies in exchange behavior, the system can adjust accordingly, mitigating the impact of the anomaly, such as by routing more traffic to exchanges that are performing normally, balancing across exchanges using various techniques described throughout this disclosure.

The user interface screen 1200 includes details of the impact of a set of toggles on bid count. The user interface screen 1300 includes details of the impact of a set of toggles on bid rate.

Figure 14:
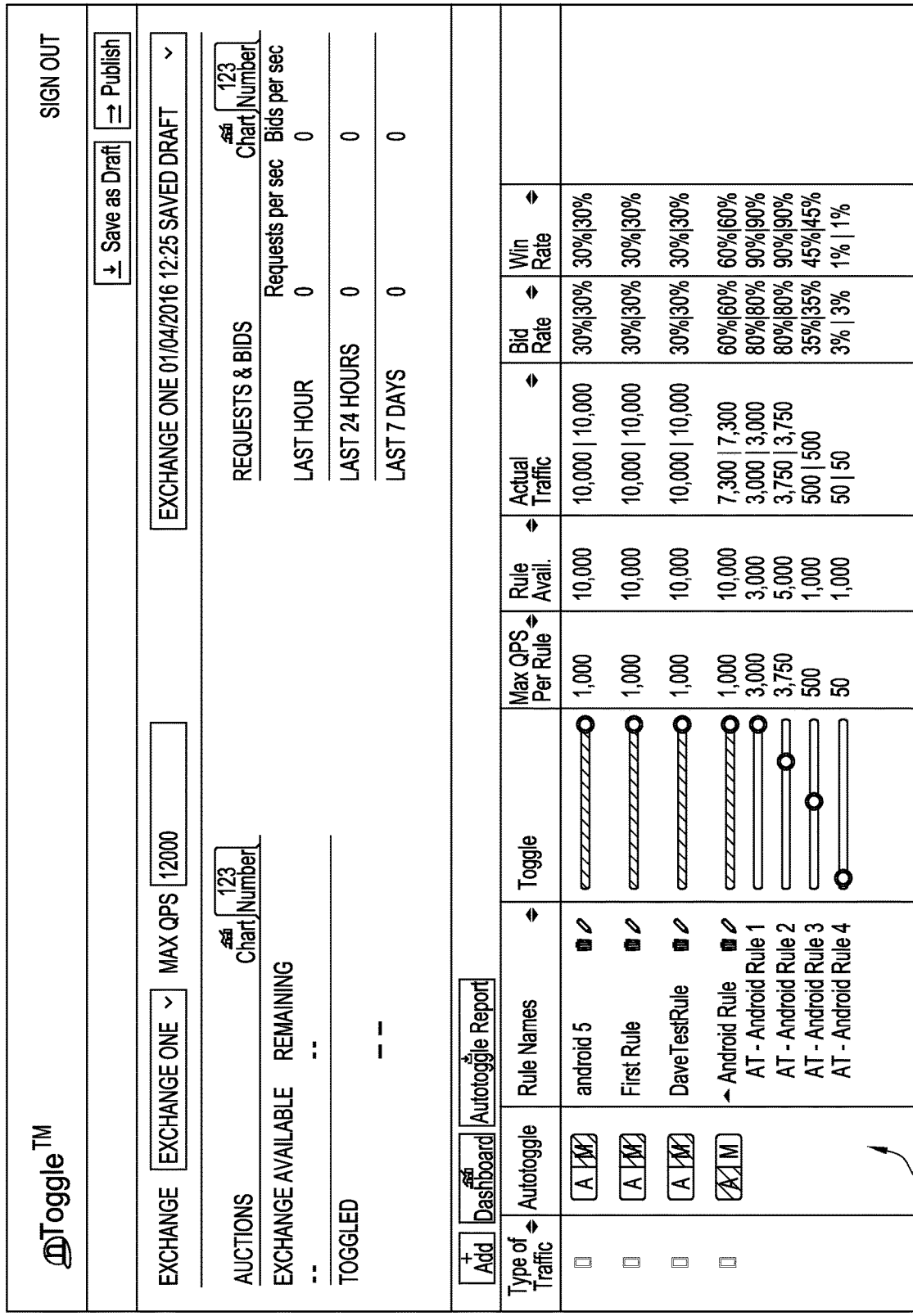
FIG. 14 illustrates an exemplary auto toggle report in a dashboard of the methods and systems described herein.

FIG. 14 shows another embodiment of a user interface 1400 for a dashboard that allows a user to see various data relating to the operation of the platform 100. A user can see which toggles (e.g., auto toggles) are in place, corresponding to particular types of rules that implement the toggles (e.g., rules relating to targeting a particular device operating system or platform with a particular amount of the traffic). For each rule, the level of a toggle can be displayed, such as from zero to 100%, as well as other parameters for the toggle and/or rule in question, such as the maximum QPS for the rule, the duration in which the rule is applied, the actual traffic, the bid rate, and the win rate. For a given rule, various sub-rules may also be shown, with similar reporting on parameters.

In embodiments, the at least one toggle component comprises a set of toggles that includes toggles each related to a different RTB ad exchange, and wherein the at least one toggle component restricts a portion of the digital advertisement inventory data traffic from being delivered to the DSP server when it is redundant to digital advertisement inventory data traffic that has already been delivered from a different RTB advertising exchange. This redundant traffic may include traffic that is recycled across multiple RTB advertising exchanges. When a mobile device, web browser, or the like makes a call or request for an advertisement (an impression), the request for the advertisement goes to the RTB advertising exchange. The RTB exchange may conduct one or more auctions among bidders that wish to serve an advertisement for that impression. This occurs very quickly (e.g., in milliseconds), and in some cases the RTB exchange does not receive a bid that satisfies the desired or minimum clearing price, in which case the impression may be recycled, or sent out again for bidding. Also, where an RTB exchange aggregates supply from multiple sources of impressions, it may receive the same impression from the different sources. In embodiments, the methods and systems disclosed herein, which filter and toggle based on attributes of traffic, may be used to identify these recycled requests, allowing them to be scored, tagged and optionally de-duplicated, such as to prevent things from bidding against themselves (e.g., having the same party put multiple competing bids for the same impression). For example, if the same publisher is sending the same traffic through multiple exchanges, the system can recognize and toggle/filter against the duplicates, to prevent auction dynamics from artificially inflating the price for that traffic as a result of bids happening from the same bidder in the different exchanges for what is in fact one item. This may be favorable for participants in demand-side platforms. Detecting whether a bidding opportunity is the same as another opportunity (i.e., that traffic is recycled or redundant) may be accomplished by reviewing headers or other elements for bids. In embodiments, it may be accomplished probabilistically; that is, a probability that two items of traffic are the same may be based on their having similar attributes. Thus, based on similarity of attributes (including timing, source location, IP addresses, type of device, and other factors), a score may be determined suggesting how similar two impressions are, and a threshold may be set for declaring that the two impressions are the same based on the score exceeding the threshold. This comparison may occur within the same exchange (such as for recycled requests within it and for redundant requests that have arrived from multiple sources) and across exchanges (such as where the exchanges have obtained the same impression from various respective sources). Once these are identified as the same impression, the platform can filter to bid only on one of the impressions, thereby avoiding artificially inflating the price of the impression as a result of the same party putting in multiple bids (on the same exchange or across various exchanges) for the same thing at times when there may not be a higher competing bid in place.

The methods and systems described herein may be deployed in part or in whole through a machine that executes computer software, program codes, and/or instructions on a processor. The processor may be part of a server, client, network infrastructure, mobile computing platform, stationary computing platform, or other type of computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other type of communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in various ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the subject matter has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

We claim:

1. A system to control programmatic advertising traffic that provides to a demand-side platform (DSP) server a desired amount and type of digital advertisement inventory data traffic from at least one real-time-bidding (RTB) advertising exchange, the system comprising:
   a network traffic management computing platform that receives the digital advertisement inventory data traffic over at least one network;
   a rate limiter component configured to limit a rate at which digital advertisement inventory data traffic is delivered to the DSP server; and
   a toggle component of the network traffic management computing platform, the toggle component comprising an optimization module implemented using a processor, configured to access machine learning resources configured to execute a machine learning algorithm and to set a plurality of different toggles in real-time at least partly in response to detected inventory composition and detected demand, the plurality of toggles comprising at least:
      an origin toggle specifying one or more origin percentages for respective origins,
      an audience toggle,
      a viewability metric toggle comprising a viewability percentage,
      a duplicates toggle configured to filter recycled digital advertisement inventory data across multiple RTB advertising exchanges or redundant digital advertisement inventory data from multiple RTB advertising exchanges to inhibit multiple competing bids from a same bidder for a given impression, and
      a fraud detection toggle,
   the toggle component configured to:
      filter the digital advertisement inventory data traffic from the at least one RTB advertising exchange in accordance with the settings of the plurality of different toggles to:
         restrict delivery of a filtered out portion of the digital advertisement inventory data traffic from the at least one RTB advertising exchange to the DSP server, and
         enable routing and delivery of a permitted portion of the digital advertisement inventory data traffic from the at least one RTB advertising exchange to the DSP server;
      route data representing a bid to at least one RTB advertising exchange associated with the permitted portion of the digital advertisement inventory data traffic delivered to the DSP server.

2. The system of claim 1 wherein the viewability toggle is related to at least one of pre-selected parameters associated with viewability characteristics of advertising traffic relative to configurations of computing devices that receive the advertising traffic.

3. The system of claim 2 wherein the toggle component permits delivery of a portion of the digital advertisement inventory data traffic having desired viewability characteristics to the DSP server.

4. The system of claim 2 wherein the toggle component restricts delivery of the digital advertising inventory data traffic lacking in desired viewability characteristics from delivery to the DSP server.

5. The system of claim 1 wherein the audience toggle is related to one or more pre-selected parameters associated with audience characteristics of the advertising traffic relative to the audience for the advertising traffic.

6. The system of claim 1 wherein the fraud protection toggle is related to one or more pre-selected parameters associated with detection of an indicator of fraud with respect to at least a portion of a bid stream associated with at least one of the digital advertisement inventory data traffic and at least one RTB ad exchange.

7. The system of claim 1 further comprising an automatic settlement module of the network traffic management computing platform that connects to a server of a financial platform to clear transactions for delivery of advertising inventory between the DSP server and at least one RTB ad exchange.

8. The system of claim 1 wherein the optimization module of the network traffic management computing platform is configured to survey digital advertisement inventory data traffic between a plurality of DSP servers and RTB ad exchanges and that tunes a set of toggles over time to improve a pre-selected parameter associated with delivery of the advertising inventory to the DSP server.

9. The system of claim 8 wherein the optimization module tunes the set of toggles over time to improve a click-through rate (CTR) parameter associated with delivery of the advertising inventory to the DSP server.

10. The system of claim 1 wherein the optimization module of the network traffic management computing platform is configured to survey the digital advertisement inventory data traffic between a plurality of DSP servers and RTB ad exchanges and automatically re-balances delivery of a portion of the digital advertisement inventory data traffic to a DSP based on a pre-selected parameter.

11. The system of claim 1 wherein the optimization module of the network traffic management computing platform is configured to survey the digital advertisement inventory data traffic between a plurality of DSP servers and RTB ad exchanges and automatically shape delivery of a portion of the digital advertisement inventory data traffic to the DSP server based on at least one of a pre-selected parameter.

12. The system of claim 11 wherein the at least one pre-selected parameter on which the optimization module automatically shapes delivery of a portion of the digital advertisement inventory data traffic to the DSP server is selected from a group consisting of a win rate parameter, an ad impression parameter, a click-through rate parameter, and a conversion rate parameter.

13. The system of claim 11 wherein the at least one pre-selected parameter on which the optimization module accesses the machine learning resources to automatically re-shape delivery of a portion of the digital advertisement inventory data traffic to the DSP server is selected from a group consisting of a bidding parameter, a win rate parameter, an ad impression parameter, a click-through rate parameter, and a conversion rate parameter.

14. The system of claim 11 wherein the optimization module automatically scales a number of cloud computing resources when it automatically shapes delivery of a portion of the digital advertisement inventory data traffic to the DSP server based on at least one of a pre-selected parameter.

15. The system of claim 1 further comprising a toggle creation module of the network traffic management computing platform that creates toggles configured to be manipulated through an associated visual UI component, each of the toggles is related to at least one pre-selected parameter and each of the toggles alters what portion of the digital advertisement inventory data traffic is restricted from being delivered to the DSP server.

16. The system of claim 15 wherein the at least one pre-selected parameter on which each of the toggles alters what portion of the digital advertisement inventory data traffic is restricted from being delivered to the DSP server is selected from a group consisting of a handset parameter, an operating system parameter, a device ID parameter, a location parameter, a type of carrier parameter, and a session depth parameter.

17. The system of claim 1 wherein the network traffic management computing platform is provided as a software-as-a-service-platform disposed between the DSP server and the at least one RTB ad exchange.

18. The system of claim 1 wherein the at least one toggle component comprises a set of toggles that includes toggles each related to a different RTB ad exchange, and wherein the at least one toggle component restricts a portion of the digital advertisement inventory data traffic from being delivered to the DSP server when it is redundant to digital advertisement inventory data traffic that has already been delivered from a different RTB advertising exchange.

19. The system of claim 1 wherein the at least one toggle component is associated with a pre-selected list of RTB ad exchanges, and wherein the toggle component only permits a portion of the digital advertisement inventory data traffic from being delivered to the DSP server when its origin is from at least one of the pre-selected list of RTB exchanges.

20. The system of claim 1 wherein the toggle component comprises a set of toggles that includes at least one toggle related to an amount of bids, and wherein the toggle component permits delivery of a portion of the digital advertisement inventory data traffic to the server of the DSP only when the amount of bids is less than a preselected amount.

21. The system of claim 20 wherein the set of toggles includes toggles each related to a different RTB ad exchange, and wherein the toggle component permits delivery of a portion of the digital advertisement inventory data traffic to the DSP server when its origin is from any one of the different RTB ad exchanges and the amount of bids is less than the preselected amount.

* * * * *